(12) United States Patent
Suk

(10) Patent No.: US 11,004,088 B1
(45) Date of Patent: May 11, 2021

(54) METHOD AND SYSTEM FOR CERTIFYING PRODUCT AUTHENTICITY USING PHYSICAL FEATURE INFORMATION INCLUDING DIGITIZED SURFACE FINGERPRINT AND BLOCKCHAIN

(71) Applicant: Insoo Suk, Seoul (KR)

(72) Inventor: Insoo Suk, Seoul (KR)

( * ) Notice: Subject to any disclaimer, the term of this patent is extended or adjusted under 35 U.S.C. 154(b) by 0 days.

(21) Appl. No.: 17/085,573

(22) Filed: Oct. 30, 2020

(30) Foreign Application Priority Data

Nov. 11, 2019 (KR) .......................... 10-2019-0143428

(51) Int. Cl.
*G06K 9/46* (2006.01)
*G06Q 30/00* (2012.01)
(Continued)

(52) U.S. Cl.
CPC ......... *G06Q 30/0185* (2013.01); *G06F 16/27* (2019.01); *G06K 9/3233* (2013.01);
(Continued)

(58) Field of Classification Search
CPC .............. G06Q 30/0185; G06T 7/0004; G06T 2207/30108; G06K 9/46; G06K 9/6201; G06K 9/3233; G06F 16/27
USPC ........ 382/100, 108, 115, 116, 118, 124, 125, 382/128, 141, 143, 149, 151, 155, 164, 382/166, 168, 171, 172, 173, 181, 190, 382/199, 201, 203, 206, 216, 224, 225, 382/232, 254, 266, 274, 275, 276, 312, 382/305; 713/150, 155, 156, 157, 168,
(Continued)

(56) References Cited

U.S. PATENT DOCUMENTS 6,259,367 B1 * 7/2001 Klein .................. B25J 9/08
340/572.1
7,222,791 B2 * 5/2007 Heilper .................. G06Q 30/06
235/385
(Continued)

FOREIGN PATENT DOCUMENTS

KR 10-2007-0104425 A 10/2007
KR 10-2011-0034625 A 4/2011
(Continued)

*Primary Examiner* — Sheela C Chawan
(74) *Attorney, Agent, or Firm* — Sughrue Mion, PLLC

(57) ABSTRACT

Disclosed is a method and system for certifying product authenticity using physical feature information including digitized surface fingerprint and blockchain, each of which manages certification information, packaged by binding together unique product information and physical feature information including surface feature of a product as a unique product feature, based on a distributed ledger of a blockchain to reliably determine whether the product is authentic or not in various ways. The authenticity certification information is packaged as a unique product feature by binding a serial number of the product for which the certification information is generated, together with physical feature information of the product, including image-based surface fingerprint. The authenticity certification information is stored in the blockchain. Determination on authenticity is made by comparing the identification information and the physical feature information with the authenticity certification information stored in the blockchain.

13 Claims, 14 Drawing Sheets

(51) Int. Cl.
   *G06F 16/27*   (2019.01)
   *G06K 9/62*    (2006.01)
   *G06T 7/00*    (2017.01)
   *G06K 9/32*    (2006.01)

(52) U.S. Cl.
   CPC .............. *G06K 9/46* (2013.01); *G06K 9/6201* (2013.01); *G06T 7/0004* (2013.01); *G06T 2207/30108* (2013.01)

(58) Field of Classification Search
   USPC .... 713/176, 169; 380/28, 30, 277, 278, 279, 380/282, 281; 705/2, 4, 406, 401, 400, 705/1.1, 408; 235/487, 492, 375, 380, 235/488; 348/E7.003, E9.039; 707/999.001, 999.01; 283/72, 109, 107, 283/904
   See application file for complete search history.

(56) References Cited

U.S. PATENT DOCUMENTS

| | | | |
|---|---|---|---|
| 8,627,086 B2* | 1/2014 | Gehrmann | G06F 21/51 |
| | | | 713/176 |
| 10,594,689 B1* | 3/2020 | Weaver | H04L 9/3247 |
| 2003/0208532 A1* | 11/2003 | Kuriya | H04L 12/14 |
| | | | 709/203 |
| 2008/0025594 A1* | 1/2008 | Metzger | G07D 7/06 |
| | | | 382/141 |
| 2011/0200224 A1* | 8/2011 | Kamperman | G06T 1/0028 |
| | | | 382/100 |
| 2014/0201094 A1* | 7/2014 | Herrington | G06Q 30/018 |
| | | | 705/317 |
| 2015/0117701 A1* | 4/2015 | Ross | G06K 9/00744 |
| | | | 382/100 |
| 2017/0243230 A1* | 8/2017 | Ross | G06F 16/5866 |
| 2019/0132138 A1* | 5/2019 | Finlow-Bates | H04L 9/3236 |
| 2019/0220971 A1* | 7/2019 | Weaver | G06T 7/0004 |
| 2020/0382307 A1* | 12/2020 | Yoon | G06K 9/00 |

FOREIGN PATENT DOCUMENTS

| | | |
|---|---|---|
| KR | 10-2012-0115183 A | 10/2012 |
| KR | 10-1274098 B1 | 6/2013 |
| KR | 10-2015-0021159 A | 3/2015 |
| KR | 10-1680542 B1 | 12/2016 |
| KR | 10-2017-0019827 A | 2/2017 |

* cited by examiner

[FIG. 1]
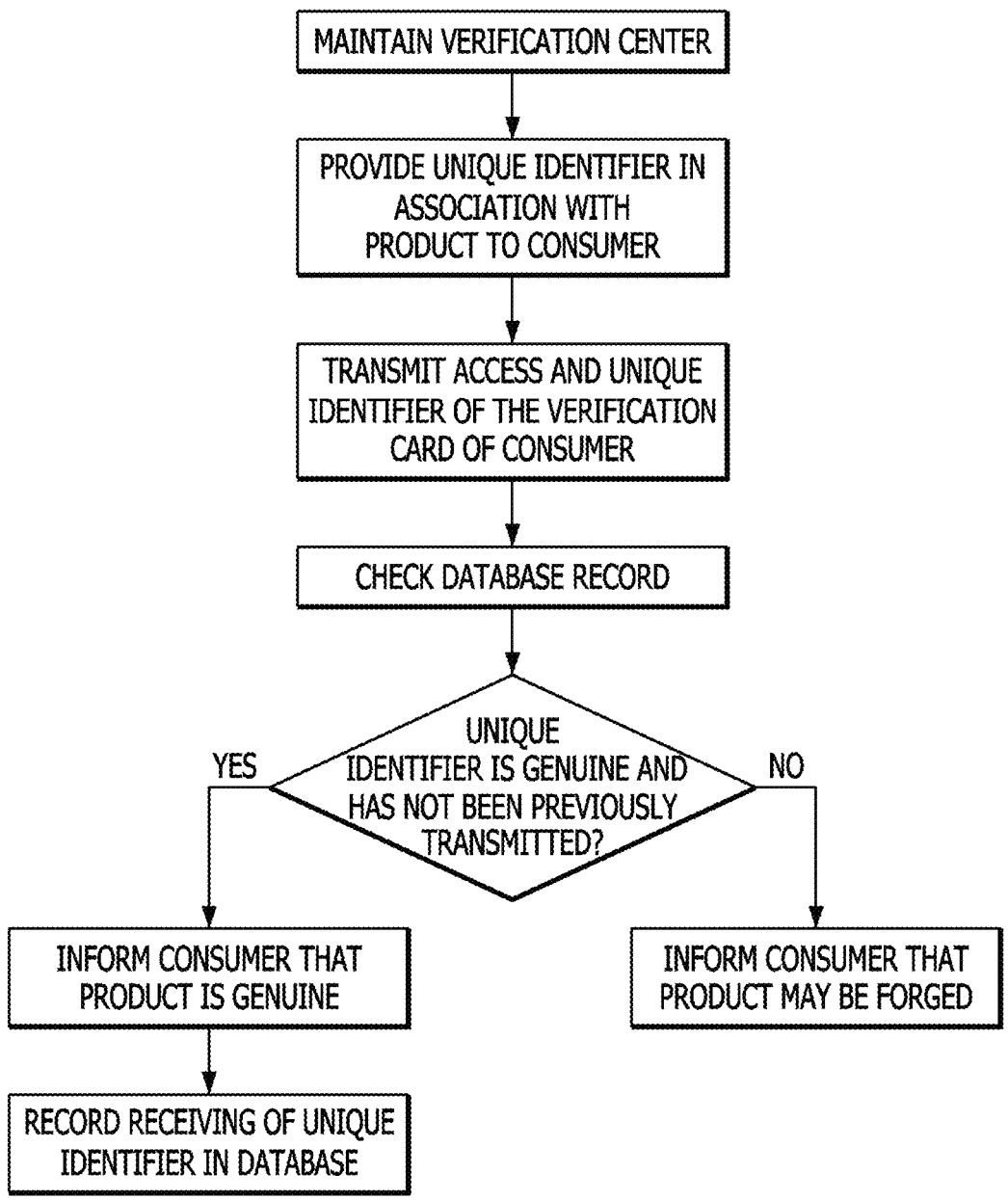

[FIG. 2]
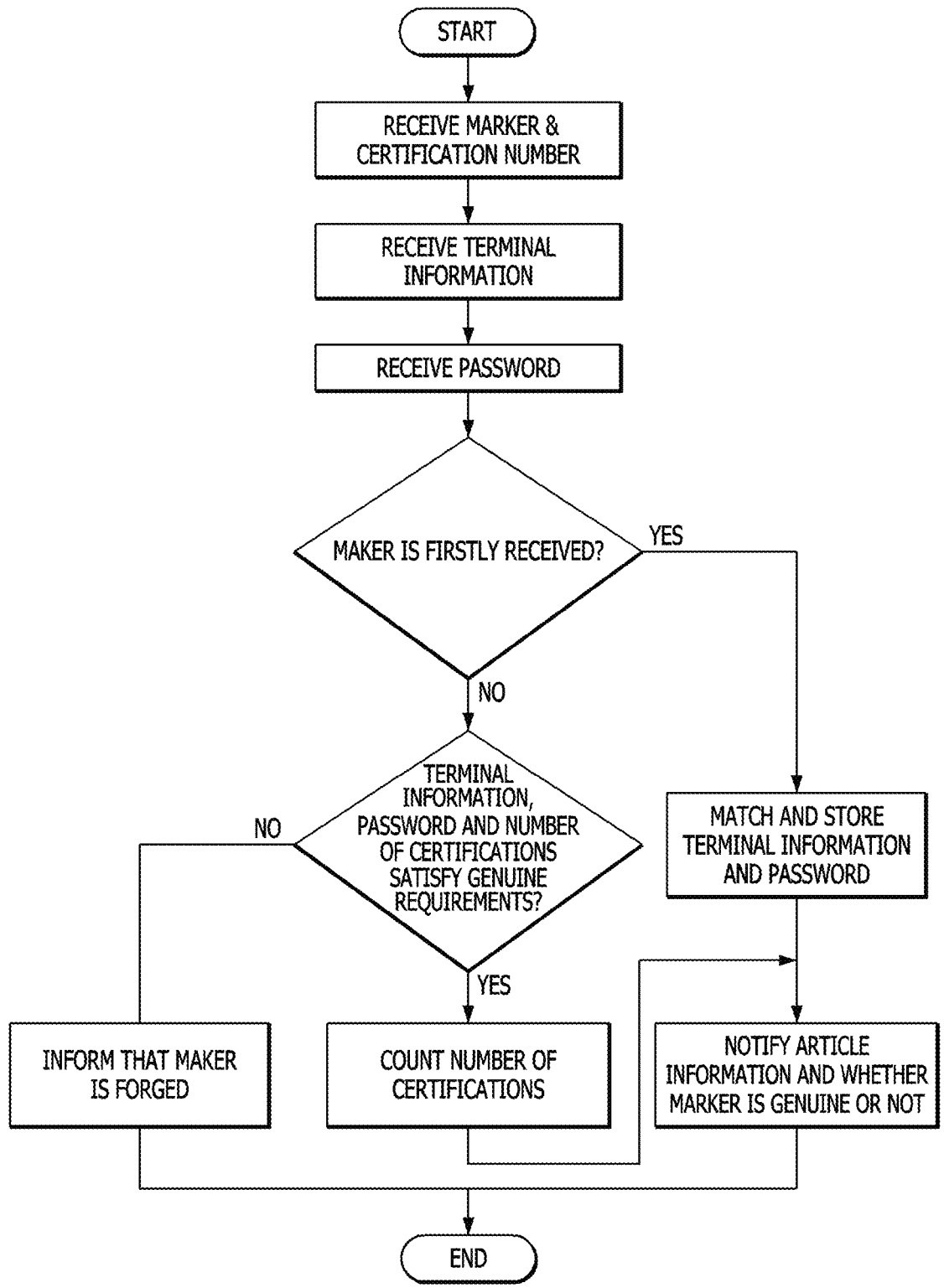

[FIG. 3A]
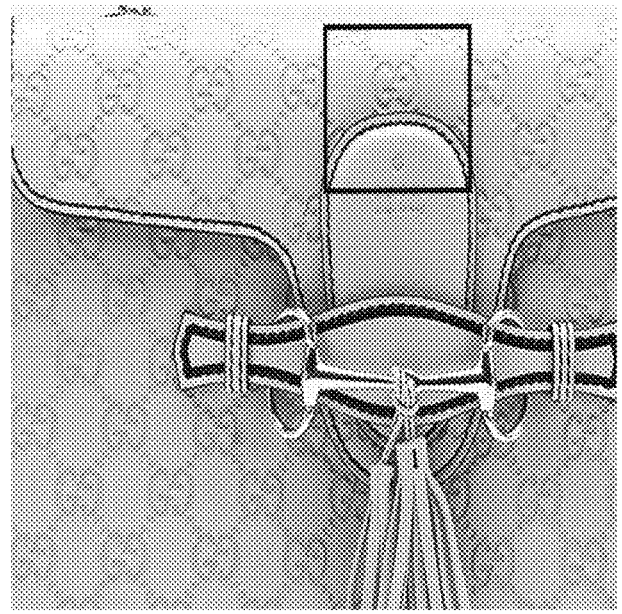
[FIG. 3B]

[FIG. 3C]
[FIG. 3D]
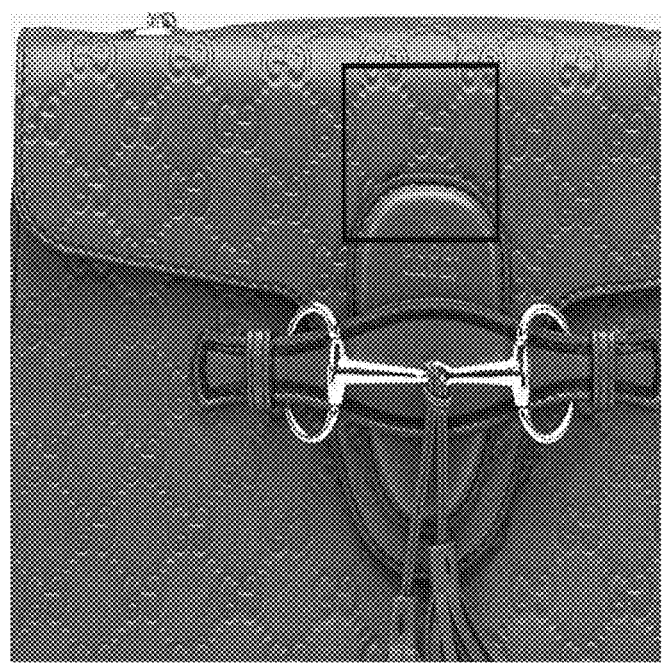

[FIG. 4]
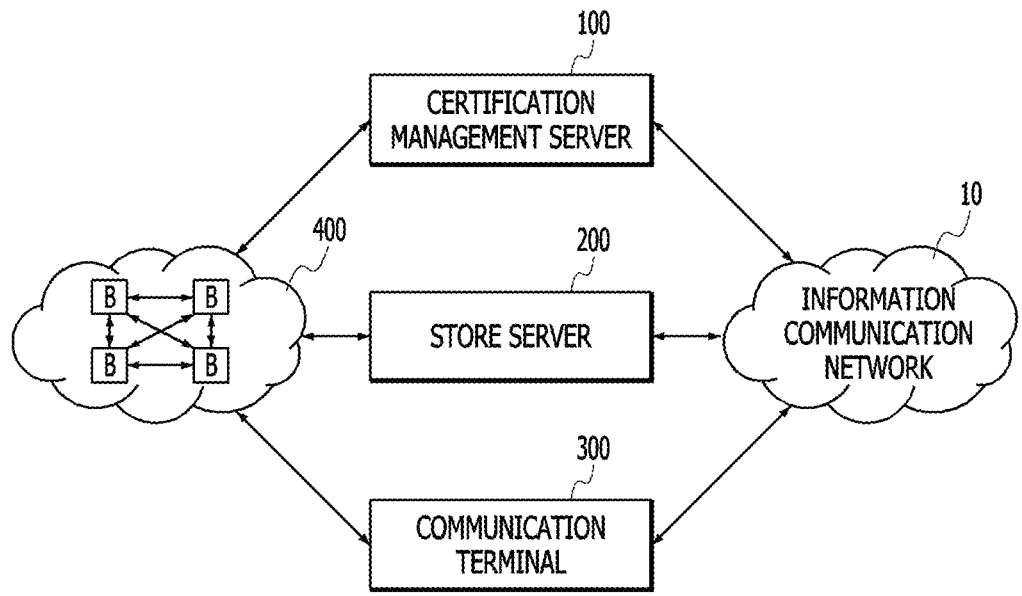
[FIG. 5]
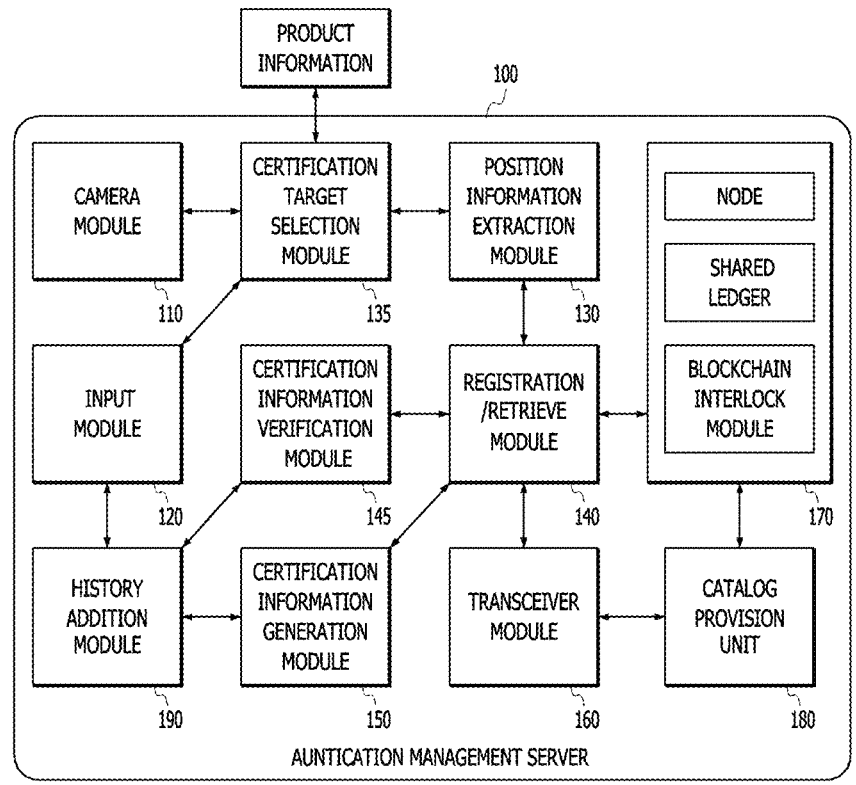

[FIG. 6]
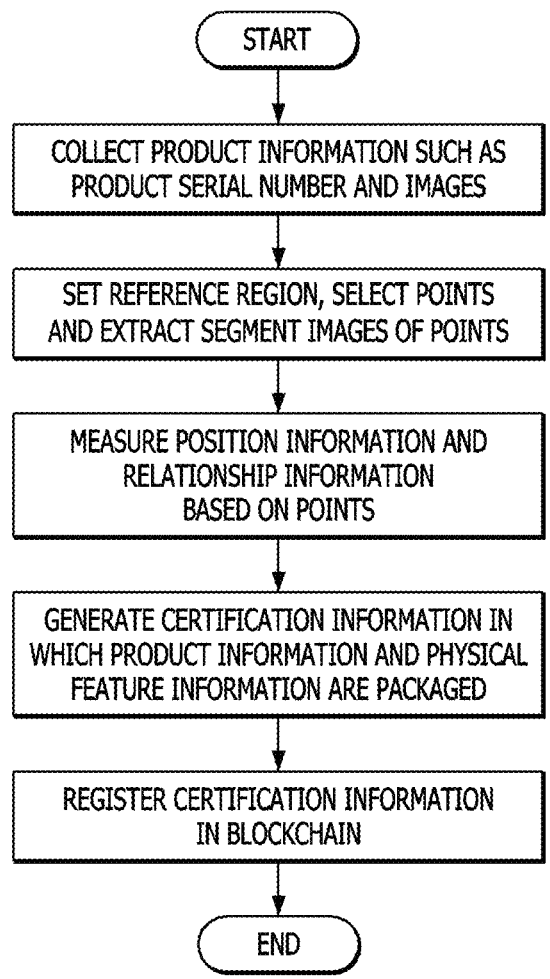

[FIG. 7]
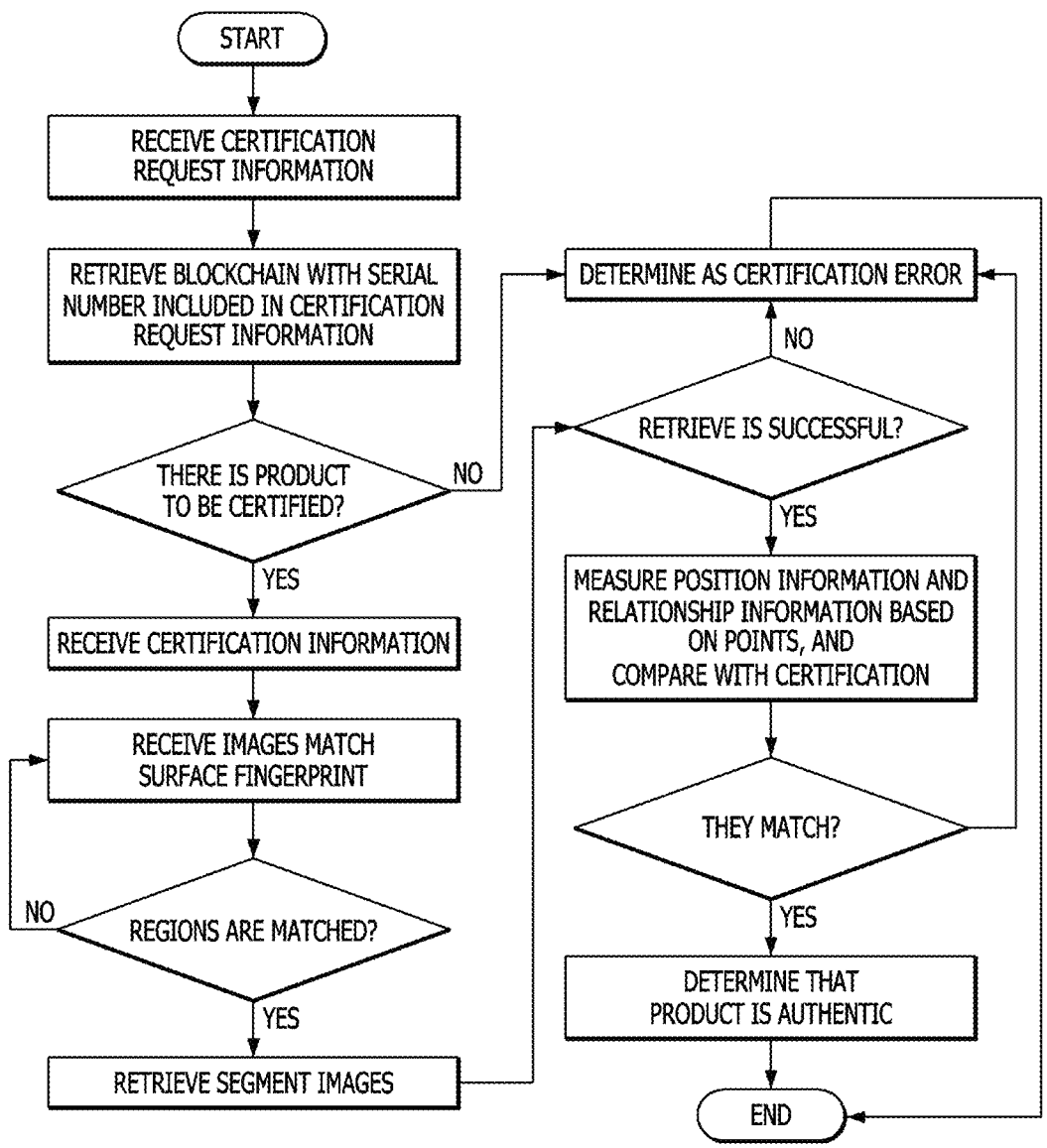

【FIG. 8】
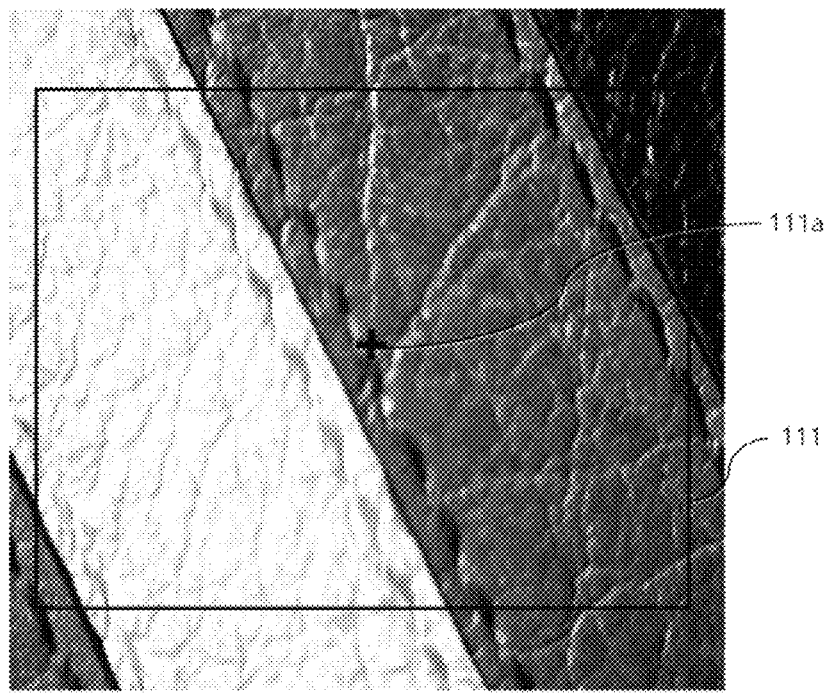
【FIG. 9】
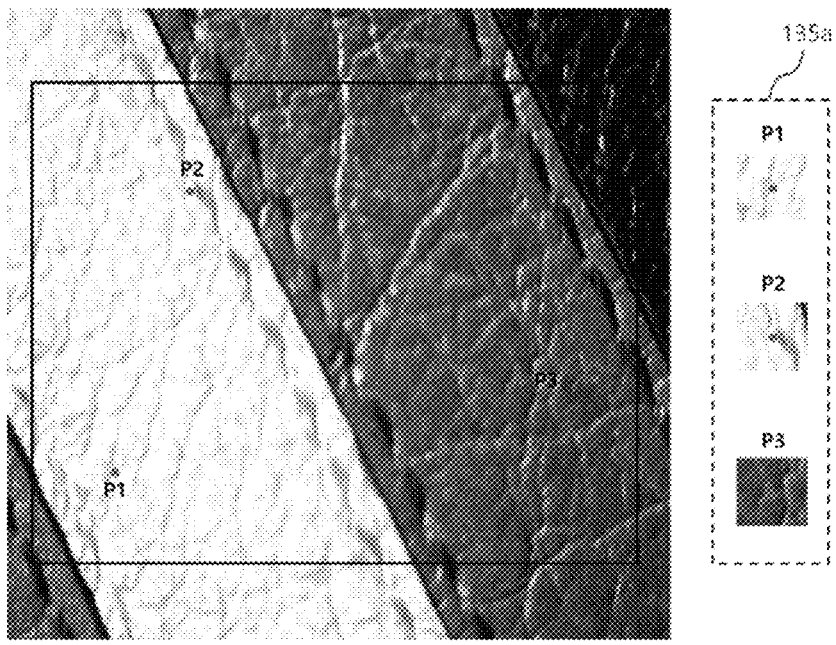

[FIG. 10]
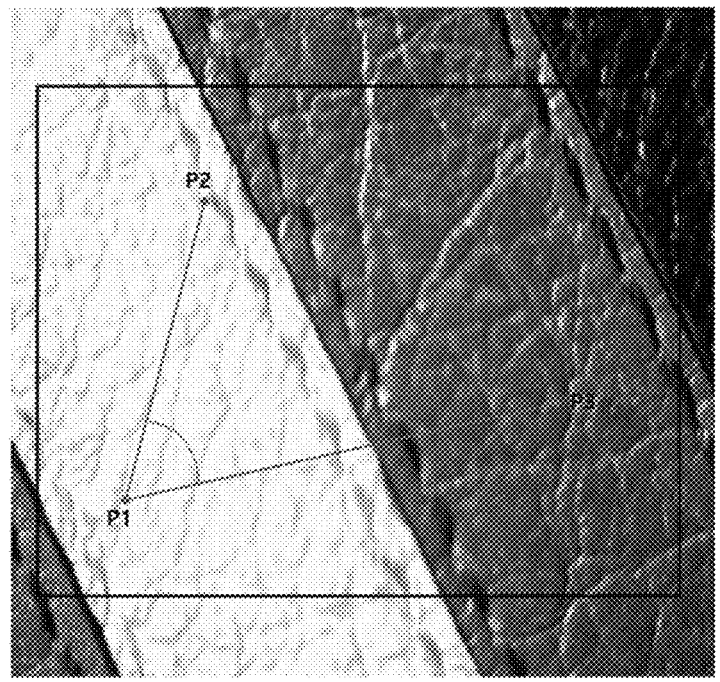
[FIG. 11]
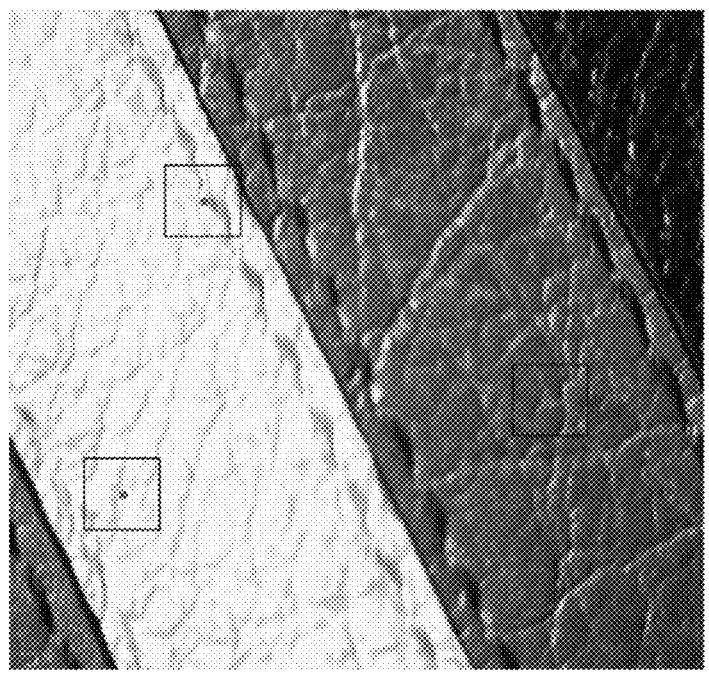

[FIG. 12]
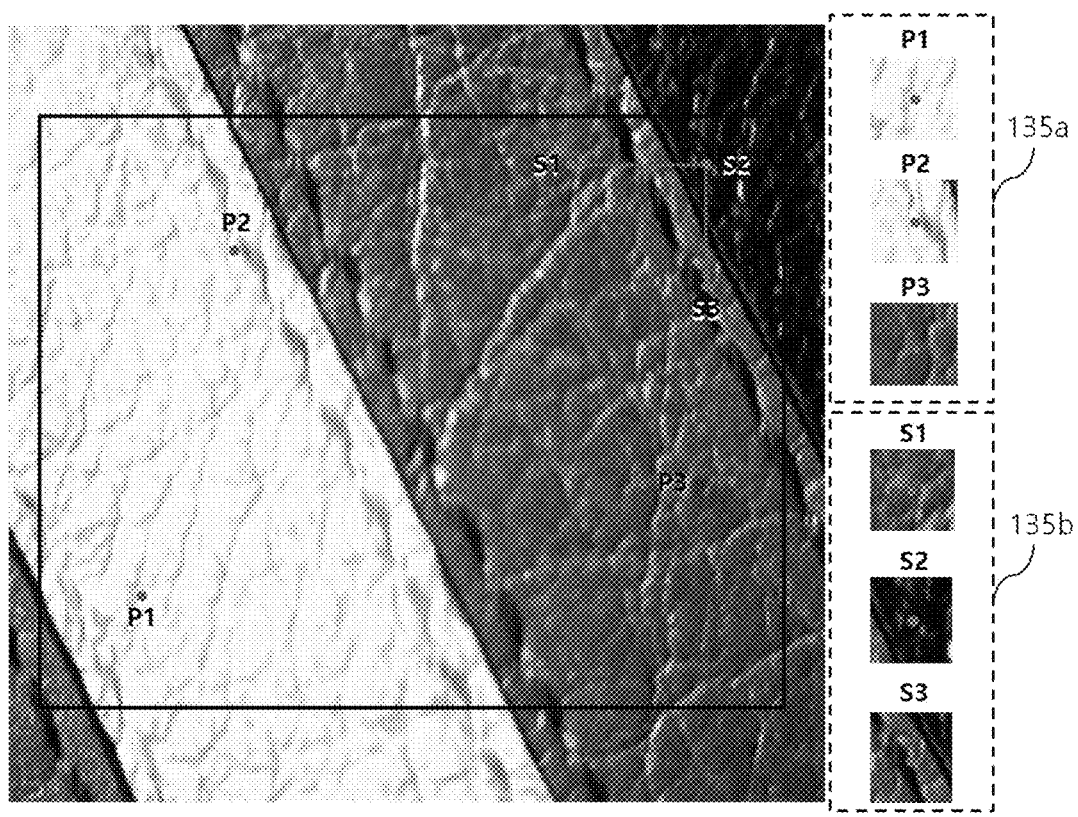

[FIG. 13]

[FIG. 14]
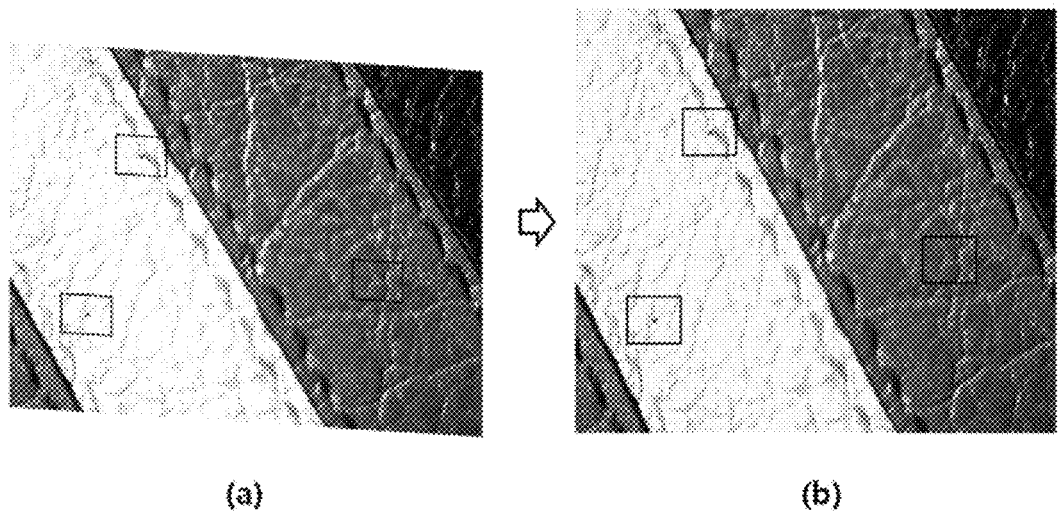
(a)  (b)
[FIG. 15]
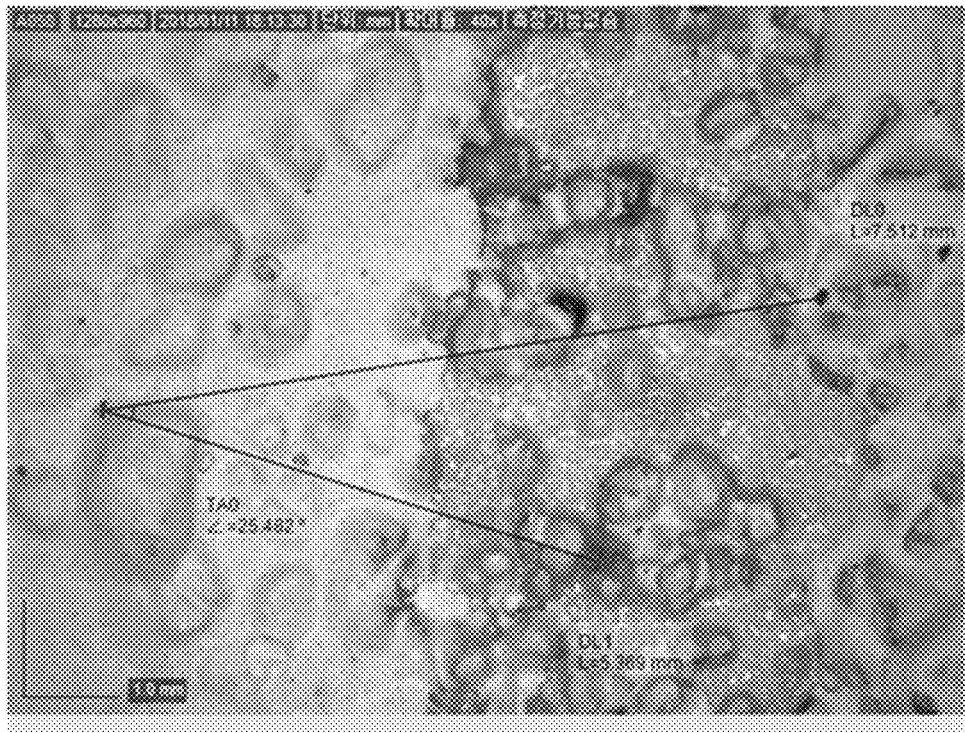

[FIG. 16]
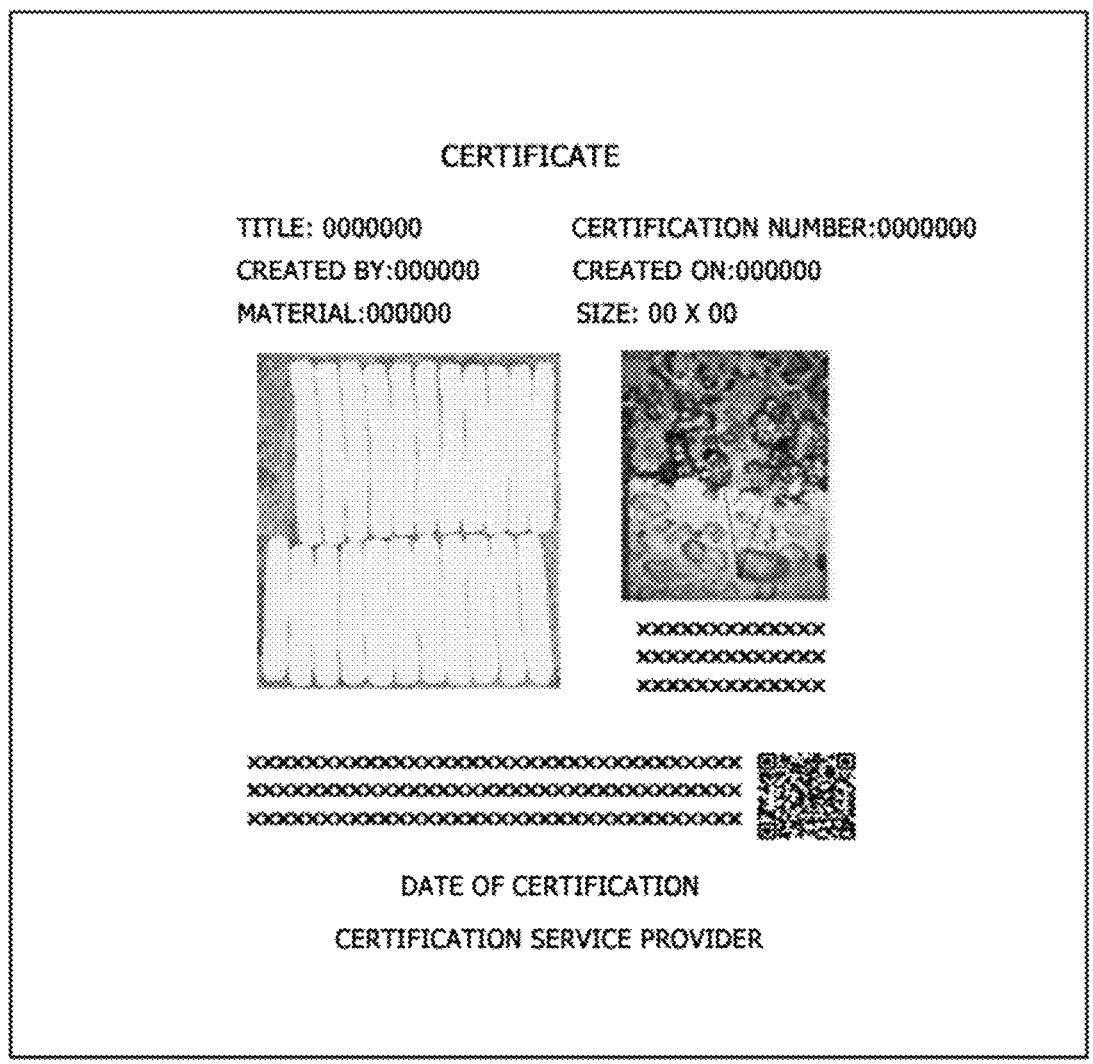

[FIG. 17]
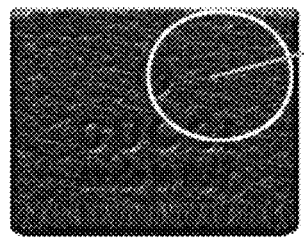
FINGERPRINT TAG (LABEL)
STORE PRODUCT INFORMATION, FINGERPRINT TAG AND SURFACE FINGERPRINT AS DISTRIBUTED DATE IN BLOCKCHAIN
A PART ENCLOSED BY YELLOW CIRCLE IS ENLARGED 30 TIMES AND DIGITIZED AS SURFACE FINGERPRINT
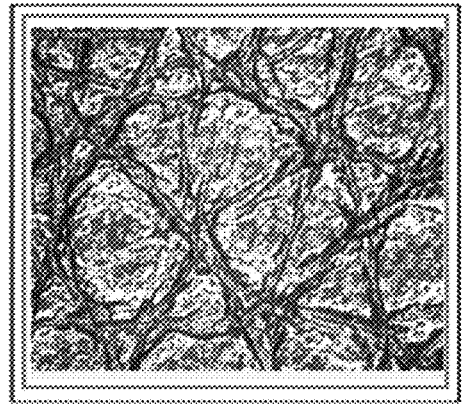
SURFACE FINGERPRINT OF AUTHENTIC FINGERPRINT TAG

METHOD AND SYSTEM FOR CERTIFYING PRODUCT AUTHENTICITY USING PHYSICAL FEATURE INFORMATION INCLUDING DIGITIZED SURFACE FINGERPRINT AND BLOCKCHAIN

CROSS-REFERENCE TO RELATED APPLICATIONS

This application is based on and claims priority from Korean Patent Application No. 10-2019-0143428, filed on Nov. 11, 2019 with the Korean Intellectual Property Office, the disclosure of which is incorporated herein in its entirety by reference.

TECHNICAL FIELD

The present invention relates to a method and system for certifying product authenticity using physical feature information including digitized surface fingerprint and blockchain. In particular, the present invention relates to a method and system for certifying product authenticity, each of which manages certification information, packaged by binding together unique product information and physical feature information including surface feature of a product as a unique product feature, based on a distributed ledger of a blockchain to reliably determine whether the product is authentic or not in various ways.

BACKGROUND

Conventionally, companies have employed advanced approaches in order to guarantee that a product is authentic (genuine) and to prevent fake or counterfeit products from being manufactured or distributed, e.g. attaching, engraving, coloring or printing infrared/ultraviolet/visible fluorescent pigment, far-infrared patterns, NFC chips, serial numbers, bar codes and RFID tags on products, as a mark indicating that this product is authentic.

However nowadays, certification marks, such as infrared/ultraviolet/visible fluorescent pigment, far-infrared patterns, NFC chips, serial numbers, bar codes and RFID tags, can easily copied or duplicated due to the technology development, thus they do not meet reliability requirements for guaranteeing the product integrity. On the contrary, there is a serious problem that those certification marks may be copied and used to deceive the consumers into believing that the products are not fake nor pony.

Anti-copying approach has been suggested that certificates or guarantees are recorded in the tamper-proof blockchain and provided as being verifiable via the blockchain. Specifically, the blockchain certification has been attracting attention since it is very useful in a case where individual authenticity should be guaranteed, for example, expensive luxuries, arts or antiques, or in a case of online wholesale, retail or auction markets. However, in such a case, only the certificates and guarantees can be protected by the tamper-proof blockchain.

For example, if a wholesaler purchases a product and receives an anti-counterfeit guarantee via the distributed ledger, he/she can intentionally and maliciously make a copy and sell the copy to a third party with the guarantee received for the purchased product; in such a case, the consumer would verify that the guarantee is not fake via the blockchain and believe the product is also genuine. In other words, the consumer cannot find whether the product is genuine or counterfeited. In such a case, the blockchain-based reliable certificate (guarantee) can be abused to illegally increase the value of counterfeited products, like other conventional certification marks.

Another approach has been attempted that a product image is provided accompanying with a physical or electrical certificate or guarantee in order to verify the product authenticity, but shape or color can be easily distorted due to shooting angle or environment and thus consistency would be compromised. Using a simple image is legally limited to verify the product validation.

Korean Unexamined Patent Application Publication No. 10-2007-00104425 (published on Oct. 25, 2007, titled "Product Authenticity Validation System") discloses a system and method for verifying the authenticity of a product, in which an unique identifier is provided to a consumer in association with a product of which authenticity is to be verified. The consumer can contact verification center and transmits the unique identifier. Records stored in the database are checked to determine if the unique identifier is genuine and if the unique identifier has been previously transmitted. If the unique identifier is not genuine or has been previously transmitted, the consumer is informed that the product may be counterfeit. If the unique identifier is genuine and has not been previously transmitted the consumer is informed that the product is authentic. A flowchart showing a process of product authenticity verification is illustrated in FIG. 1.

Korean Unexamined Patent Application Publication No. 10-2011-0034625 (published on Apr. 5, 2011, titled "System and Method for Certifying Genuine Article Using Maker") and 10-2012-0115183 (published on Oct. 17, 2012, titled "System and Method for Certifying Genuine Article Using Maker) respectively discloses a system and method for certifying genuine articles, in which a maker image obtained by imaging a marker on an article and a certification number is received from a mobile terminal. It is determined whether the marker is genuine or not based on the received combination of the maker and the certification number, and the determination result is provided to the mobile terminal. A flowchart showing a process for certifying genuine articles is illustrated in FIG. 2.

As stated above, a certification number, verification card or maker is used in the conventional technologies for retrieving and recording the product information in the database, and determining whether the product is authentic or not. Therefore, the anti-counterfeit solution has not been found yet in the case where the certification number, verification card or maker is forged and attached to the counterfeited product before the genuine product is launched and sold in the market. If the fake is sold first and registered in the database, the genuine product may be wrongfully accused of the pony.

FIGS. 3A to 3D show the physical appearances of four products with the same design. As understood from the drawings, they are all authentic products; however, by enlarging and comparing the same parts of the four products, it is confirmed that they have different position information such as the position coordinates, angles, gaps, and distances of specific surface points. Such differences can be found in dozens in the single product. As physical appearance cannot be used as a reference for distinguishing genuine products from fake ones, it is extremely difficult for the examiner to visually determine whether the product is authentic based on the physical features since there are replicas elaborately manufactured with the same materials and the same serial numbers as those of the genuine products.

The four products shown in FIGS. 3A to 3D have the different serial numbers, but authenticity verification is not affected even if those number can be randomly reattached to other products. In the conventional approach of building a database with serial numbers, it is determined whether the product is authentic or not only based on with or without the serial number. That is, counterfeited products cannot be prevented if they steal the serial numbers.

As stated above, the product authenticity verification only with the certification marks, such as infrared/ultraviolet/ visible fluorescent pigment, far-infrared patterns, NFC chips, serial numbers, bar codes and RFID tags, is not sufficiently reliable.

Another approach has been suggested that the company captures precise images of specific positions on the product with a special precision camera according to its own criteria. The manager selects feature points on the precision image, measures accurate distance and angle between the points, and stores in association with the serial number, thereby generating and storing the certification information in the database. When the consumer visits a store or head office, having such a special camera, with a product of which authenticity is to be verified, a position at which the certification information has been generation is found and imaged. Determination whether the product is authentic (product integrity) is made by selecting the specific position designated by the manager and confirming that the distance and angle between the points are accurate.

However, such a method has still problems that the criteria for selecting the product's shooting location are not clearly defined, and errors may occur upon selecting the specific point again, and the certification is not easily conducted since the special precision camera is required which accurately measure the actual distance with a tolerance of several to tens of micrometers without distortion.

Therefore, demand for improved method and system for certifying product authenticity is increasing, each of which is capable of efficiently extracting, storing and confirming information enabling the reliable product authenticity verification, and of determining whether the product is authentic or not in various ways.

PRIOR ARTS DOCUMENTS

Patent Documents

Patent Document 1: KR10-2007-0104425-A
Patent Document 2: KR10-2011-0034625-A
Patent Document 3: KR10-2012-0115183-A

SUMMERY OF THE INVENTION

Problem to be Solved

An object of the present invention is to provide a method and system for certifying product authenticity using physical feature information including digitized surface fingerprint and blockchain, in which authenticity certification information is packaged as a unique product feature by binding a serial number (or equivalent) of a product, provided by a manufacturer or a seller, together with physical feature information of the product, including image-based surface fingerprint. The authenticity certification information is retrievably stored in the blockchain. The authenticity certification information includes an image that can serve as a reference for collecting the digitized surface fingerprint information from the product image. Therefore, a certification region is automatically selected from the images of the product to be certified, and the digitized surface fingerprint information is extracted from the certification region to determine whether the product is authentic or not, thereby improving the convenience and reliability.

Another object of the present invention is to provide a method and system for certifying product authenticity using physical feature information including digitized surface fingerprint and blockchain, in which the certification region is determined from the product image for generating the certification information, a plurality of points are selected from the certification region, and then the segment images are selected to identify those points. Numerical information on the distance and angle relationship between points is calculated. The certification information includes image information on the certification region, the segment image information and numerical information. The certification region is automatically detected from the image of the product to be certified by comparing the image of the product to be certified with the image of the certification region included in the certification information. The segments are detected from the certification region. The image distortion is compensated based on the comparison result. The numerical information between the points is calculated and compared with the numerical information included in the certification information to determine whether the product is authentic or not. Even if the image of the product to be certified is distorted or nobody knows the correct certification information, the product authenticity verification can be conveniently conducted via the company server, store server or communication terminal owned by the seller or consumer.

Still another object of the present invention is to provide a method and system for certifying product authenticity using physical feature information including digitized surface fingerprint and blockchain, in which points for displaying correct reference distance are added so that the numerical information between points within the certification region can be measured even without the precision camera. A distance between the points can be correctly calculated based on a distance between the reference distance points. Alternatively, the certification is carried out based on the relative values using information on ratio and angle between the points only, and thus the product authenticity verification can be conducted even with a camera which is not capable of measuring the precise distance.

Further still another object of the present invention is to provide a method and system for certifying product authenticity using physical feature information including digitized surface fingerprint and blockchain, in which information on access for the certification information is stored in the blockchain after the certification information is stored in the blockchain network. When a difference falling outside a predetermined standard is found from the information included in the certification information, a type of the product and the difference found upon the certification of the company or store node. The product authenticity verification can be conducted taking account of the changes due to usage, thus it is possible to certify not only for new products but also for products in use or for products held for a long time.

Means for Solving the Problem

For solving the problem stated above, according to one aspect of the present invention, provided is a method for certifying product authenticity using physical feature information of a product, including digitized surface fingerprint, and a blockchain, the method being implemented by a certification management server, in a system including the certification management server that is communicably connected with a store server operated by a manufacturer or a seller via an information communication network, in which the certification management server receives certification request information required for product certification from the store server or a communication terminal, each of which is capable of scanning and decoding product identification information and capturing a product image, and transmits certification result information, and in which at least one of the store server and the certification management server is interlocked with a blockchain network as a node, the method including steps of: (a) extracting image information of at least a part of a certification region and segments corresponding to a plurality of certification points, by setting the certification region from a product image captured or received and by determining the plurality of the certification points within the certification region, as physical feature information of a product corresponding to the product identification information received; (b) measuring physical arrangement relationship between the certification points, generating digitized surface fingerprint information of the certification region based on such a measured relationship, and generating certification information by combining the extracted image information and the digitized surface fingerprint information generated with the product identification information as a package, followed by transmitting the generated certification information to the interlocked blockchain network to be registered in a shared ledger of each node; (c) receiving, when the store server or the communication terminal transmits a request for certifying product authenticity, certification request information including identification information and image information of a product to be certified, and retrieving certification information of the product corresponding to the product identification information included in the certification request information from the blockchain shared ledger; and (d) comparing the image information of the product to be certified, included in the certification request information received, with the image information included in the product certification information retrieved from the blockchain shared ledger, to select a certification region and certification points from the image information of the product to be certified, calculating digitized surface fingerprint information for the selected certification points, which is compared with the digitized surface fingerprint information included in the product certification information retrieved to determine whether the product is authentic or not, and providing the certification result to the store server or the communication terminal.

In one embodiment, the step (a) may further include: displaying an outline of the product image for setting the certification region on a display of the certification management server; providing an interface for setting a boundary; and varying at least one of a size and a shape of the boundary by inputting to the interface.

In one embodiment, the step (a) may further include: determining the plurality of the certification points within the certification region randomly up to a preset number of points, or alternatively, determining based information on numbers or positions designated by a user, which is received via an interface accepting the user's input.

In one embodiment, the step (b) may further include: (b1) measuring distance information and angle information based on position information of the certification points to generate the digitized surface fingerprint information for the certification region using the measured information; (b2) generating packaged certification information as a unique product feature by combining the digitized surface fingerprint information and image information of at least a part of the certification region and segments corresponding to the certification points, with the product identification information, so that the certification information is retrieved by the product identification information; and (b3) transmitting the generated certification information to the interlocked blockchain network as a transaction to be added to a periodically generated block, thereby sharing the certification information by a shared ledger provided in each node of the blockchain network.

In one embodiment, the step (d) may further include: (d1) obtaining the image information of at least a part of the certification region and segments corresponding to the certification points, from the product certification information retrieved from the blockchain shared ledger, and then retrieving an image of at least a part of the certification region from the image information of the product to be certified to select the matched certification region from the image information of the product to be certified; (d2) retrieving, when the certification region is selected from the image information of the product to be certified, images of the segments corresponding to the certification points included in the certification information from such a certification region to select the matched certification points; and (d3) calculating, when the certification points are selected from the image information of the product to be certified, the digitized surface fingerprint information for each certification point.

In other embodiment, distortion of the image information of the product to be certified may be compensated based on the image of the certification region or the segments corresponding to the certification points, matched in the image information of the product to be certified, in at least one of the step (d1) or (d2).

In other embodiment, the step (a) may further include automatically determining at least two reference distance points representing a correct reference distance, and extracting image information of segments corresponding to the reference distance points; the step (b) may further include embedding the image information of the segments corresponding to the reference distance points into the certification information; and the step (d) may further include obtaining reference distance information by retrieving the segments corresponding to the reference distance points from the image information of the product to be certified and selecting the matched reference distance points, and then calculating distance information for each certification point based on the reference distance information.

The method may further include a step of (e) generating certificates or guarantees for one or more products using the certification information stored in the blockchain shared ledger, or alternatively, generating a catalog containing such certificates or guarantees, thereby providing to the communication terminal or the store server.

In other embodiment, the step (d) may further include: extracting, when a part of the certification region or the certification points is altered and thus the certification is failed upon determining whether the product to be certified is authentic or not, the altered information in accordance with a request from the store server or the communication terminal or conditions predetermined for the product; transmitting a transaction to the blockchain network as the altered information for the product to be certified; and storing the altered information by adding the transaction to the certification information of such a product, wherein it is set to put the higher priority on information stored earlier among the certification information stored in the shared ledger and the altered information additionally stored upon the certification.

According to another aspect of the present invention, provided is a system for certifying product authenticity using physical feature information of a product, including digitized surface fingerprint, and a blockchain, the system including:

a certification management server which:
extracts image information of at least a part of a certification region and segments corresponding to a plurality of certification points, by setting the certification region from a product image captured or received and by determining the plurality of the certification points within the certification region, as physical feature information of a product corresponding to the product identification information received,
measures physical arrangement relationship between the certification points, generating digitized surface fingerprint information of the certification region based on such a measured relationship, and generates certification information by combining the extracted image information and the digitized surface fingerprint information generated with the product identification information as a package, followed by transmitting the generated certification information to the interlocked blockchain network to be registered in a shared ledger of each node,
receives certification request information including identification information and image information of a product to be certified, and retrieves certification information of the product corresponding to the product identification information included in the certification request information from the blockchain shared ledger, and
compares the image information of the product to be certified, included in the certification request information received, with the image information included in the product certification information retrieved from the blockchain shared ledger, to select a certification region and certification points from the image information of the product to be certified, calculates digitized surface fingerprint information for the selected certification points, which is compared with the digitized surface fingerprint information included in the product certification information retrieved to determine whether the product is authentic or not, and provides the certification result;
a store server which provides to the certification management server the certification request information including the identification information and the image information of the product to be certified, and receives the certification result from the certification management server to output the result via a display or a printer provided therein; and
a communication terminal which provides to the certification management server the certification request information including the identification information and the image information of the product to be certified, and receives the certification result from the certification management server to output the result via a display provided therein.

In one embodiment, the store sever may include a node configuration of the blockchain network and holds all certification information by the shared ledgers of the nodes; receive or accept the identification information of the product to be certified to retrieve the certification information of the product corresponding to the product identification information from the shared ledger held; capture an image of the product to be certified by a camera provided therein; select the certification region and the certification points from the image information of the product to be certified based on the image information included in the product certification information retrieved; calculate the digitized surface fingerprint information for the selected certification points, which is compared with the digitized surface fingerprint information included in the product certification information retrieved to determine whether the product is authentic or not; and output the certification result.

In one embodiment, the communication terminal may include a node configuration of the blockchain network and hold all certification information by the shared ledgers of the nodes, or alternatively, at least retrieve the certification information via the blockchain network; receive or accept the identification information of the product to be certified to retrieve the certification information of the product corresponding to the product identification information via the blockchain network; capture an image of the product to be certified by a camera provided therein; select the certification region and the certification points from the image information of the product to be certified based on the image information included in the product certification information retrieved from the blockchain shared ledger; calculate the digitized surface fingerprint information for the selected certification points, which is compared with the digitized surface fingerprint information included in the product certification information retrieved to determine whether the product is certified as original or not; and display the certification result.

In one embodiment, the certification management server may generate the certification information by combining fingerprint tag information associated with a fingerprint tag previously made and attached to the inside of the product, the digitized surface fingerprint information for a certification region set within the fingerprint tag, and the product information as a package, followed by transmitting the generated certification information to the interlocked blockchain network to be registered in the shared ledger of each node.

Advantageous Effects of the Invention

According to the method and system for certifying product authenticity using physical feature information including digitized surface fingerprint and blockchain of the embodiment of the present invention, the authenticity certification information is packaged as a unique product feature by binding a serial number (or equivalent) of the product for which the certification information is generated, together with physical feature information of the product, including image-based surface fingerprint. The authenticity certification information is stored in the blockchain. Determination whether the product is authentic or not is made by comparing the identification information of the product to be certified and the physical feature information including the digitized surface fingerprint extracted from the image information of the product to be certified with the authenticity certification information stored in the blockchain, thereby improving the convenience and reliability of the authenticity certification.

In particular, according to the present invention, the authenticity certification information includes the image that can serve as a reference for collecting the digitized surface fingerprint information from the product image, and the certification region of the product to be certified and the region from which the surface fingerprint is confirmed are automatically extracted based on the image included in the certification information upon the certification for the product to be certified, thereby improving the convenience of the certification. Furthermore, the image distortion of the product to be certified is automatically compensated by image-based matching, thus the authenticity certification is enabled even with the store server or the communication terminal provided with a low-precision camera.

Furthermore, the reliable authenticity certification can be provided even with a camera which is not capable of measuring the precise distance, by adding the information on the reference distance points when generating the certification information, or alternatively, by generating the arrangement information of the certification points with the information on ratio and angle between the points only, while the certification information for the authenticity certification can be reliably retrieved by the store server or the communication terminal without accessing the certification management server, thereby improving the convenience and reliability.

Additionally, the authenticity certification can be carried out taking account of the changes occurring due to the usage by registering, when the changes to a limited extent are detected upon the certification, new information on the changed parts, thereby advantageously enabling the reliable authenticity certification even when the product is changes over time.

BRIEF DESCRIPTION OF THE DRAWINGS

FIG. 1 is a flowchart illustrating a function of product authenticity validation with a unique identifier;

FIG. 2 is a flowchart illustrating a function of product authenticity validation with a conventional maker;

FIGS. 3A to 3D are diagrams for comparing appearances of four products with the same design;

FIG. 4 is a block diagram illustrating a schematic configuration of an authenticity certification system using a blockchain and physical feature information of a product including a digitized surface fingerprint;

FIG. 5 is a block diagram illustrating a detailed configuration of a certification management server of FIG. 4;

FIG. 6 is a flowchart illustrating a process of generating and storing the certification information of the certification management server according to an embodiment of the present invention;

FIG. 7 is a flowchart illustrating an authenticity certification process of the product to be certified of the certification management server according to the embodiment of the present invention;

FIGS. 8 to 10 are exemplary diagrams illustrating a process of generating digitized surface fingerprint information of the product according to the embodiment of the present invention;

FIG. 11 is an exemplary diagram illustrating a process for extracting the digitized surface fingerprint information of the product to be certified according to the embodiment of the present invention;

FIG. 12 is an exemplary view illustrating a process of generating the digitized surface fingerprint information of the product according to another embodiment of the present invention;

FIG. 13 is an exemplary diagram illustrating an interface configuration for displaying a result of calculating the digitized surface fingerprint information according to an embodiment of the present invention;

FIG. 14 is an exemplary diagram illustrating a process of correcting image distortion of the product to be certified according to the embodiment of the present invention;

FIG. 15 shows an example of a certification region image including the digitized surface fingerprint information according to the embodiment of the present invention;

FIG. 16 shows an example of a certificate including the digitized surface fingerprint information according to the embodiment of the present invention; and FIG. 17 shows examples of a fingerprint tag included in the certification information and the digitized surface fingerprint information of the fingerprint tag according to the embodiment of the present invention.

EMBODIMENTS OF THE INVENTION

The present invention as described above will be described in detail referring to the accompanying drawings and embodiments.

It should be noted that technical terms used in the specification are only used to describe specific embodiments, and not intended to limit the present invention. The technical terms used in the specification shall be interpreted as generally understood by those having ordinary skill in the art, unless otherwise defined. It should not be construed as being overly comprehensive or excessively limited. When a technical term used in the specification is incorrect and does not accurately express the spirit of the present invention, a technical term that can be correctly understood by those skilled in the art should be replaced and understood. General terms used in the present invention shall be interpreted as defined in the general dictionary in the context of the specification, and not be interpreted as being excessively limited.

As used herein, the definitions of words in the singular herein shall apply to such words when used in the plural where the context so permits and vice versa, unless otherwise specified. As used herein, the term "comprising/comprise" or "consisting of/consist of" shall not be interpreted as that elements or method steps disclosed in the specification must be included; it is inclusive or open-ended and does not exclude additional elements, compositional components, or method steps.

The terms including ordinal numbers such as "first" and "second" used in the specification may be used to describe the elements, but the elements should not be limited by those terms. The terms are used only for distinguishing components from each other. For example, without departing from the scope of the present invention, a first component may be referred to as a second component, and also, a second component may be referred to as a first component.

Hereinafter, preferred embodiments of the present invention will be described in detail with reference to the accompanying drawings, but identical or similar components are assigned the same reference numerals regardless of signs in the drawings, and redundant descriptions thereof will be omitted.

Upon describing the present invention, when it is determined that a detailed description of known technology may inhibit the subject matter of the present invention, a detailed description thereof will be omitted. It should be noted that the accompanying drawings are only for better understanding the spirit of the present invention, and shall not be construed as restricting the spirit of the present invention.

In the system according to the present invention, although the separate descriptions thereof will be omitted, the information communication network refers to a network based on wireless Internet, short-range communication, or wired communication. Examples of the wireless Internet includes a wireless LAN (WLAN), Wireless Broadband (Wibro), Wimax (World Interoperability for Microwave Access), High Speed Downlink Packet Access (HSDPA), IEEE 802.16, Long Term Evolution (LTE), and Wireless Mobile Broadband Service (WMBS). Examples of short-range communication include Bluetooth, Wi-Fi, RFID (Radio Frequency Identification), Infrared Data Association (IrDA), UWB (Ultra Wideband), ZigBee, Near Field Communication (NFC), Ultra Sound Communication (USC), Visible Light Communication (VLC), and Bluetooth Low Energy (BLE). Examples of the wired communication include power line communication (PLC), USB communication, Ethernet, serial communication, and optical/coaxial cable communication.

The certification management server or store server can be configured with various types of servers including a single computer, a parallel computer, and a distributed computer. A display and an input device (keyboard and mouse) for exchanging information with the user may be provided. Furthermore, a camera capable of capturing the product, or at least a configuration capable of interlocking with such a camera may be provided.

The communication terminal encompasses various types of terminal devices capable of online access, which is owned by the company manager, store manager or customer. Examples thereof include various terminals such as smartphone, portable terminal, mobile terminal, personal digital assistant (PDA), portable multimedia player (PMP), terminal, personal computer, notebook computer, slate PC, tablet PC, and ultrabook.

FIG. 4 is a block diagram illustrating a schematic configuration of an authenticity certification system according to the present invention, and FIG. 5 is a block diagram illustrating a detailed configuration of a certification management server 100 of FIG. 4.

As shown in the drawing, the overall system configuration for implementing the present invention includes the certification management server 100, a store server 200, and a communication terminal 300, which are communicably connected via the information communication network. The configuration includes a blockchain network 400, in which the certification management server 100, the store server 200, and the communication terminal 300 interlock with each other as nodes.

The blockchain network 400 is a dedicated configuration for certifying product authenticity according to the embodiment of the present invention, and may be configured by using the certification management server 100, the store server 200, and the communication terminal 300 as nodes. Alternatively, it may be a blockchain network configured in a cryptocurrency or token system or a third-party blockchain network for tamper-proof data management, which serves to include and store the authenticity certification information of the present invention as one of the various transactions. For example, it is possible to configure a blockchain network for storing and retrieving certification information to verify product authenticity as a side chain for a specific main chain.

The certification management server 100 generates the certification management server which is packaged as a unique product feature by binding the serial number of the product or the equivalent identification information, received from the manufacturer or the seller, or alternatively, captured and extracted by the camera, together with the physical feature information of the product material. The packaged certification information is transmitted to and stored in the blockchain network 400. The certification information is configured to be retrievable by the identification information and transmitted as a transaction to the blockchain network 400, which is periodically stored in the shared ledgers of all interlocking nodes included in the block (the certification management server 100, the store servers 200, and the communication terminals 300). The communication terminal 300 can be directly linked as a node of the blockchain network 400, but in such a case, the shared ledger shall be retained. Therefore, the communication terminal 300 may access (login) to the certification management server 100 or the store server 200, and then indirectly access the shared ledger of certification management server 100 or the store server 200. In other words, the communication terminal 300 does not have to sever as a node of the blockchain network 400 as in the illustrated embodiment.

In principle, the certification management server 100 sets the certification region from a product image captured or received and determines the plurality of the certification points within the certification region, as physical feature information of a product corresponding to the product identification information received, thereby extracting the image information of at least a part of the certification region and the segments corresponding to the certification points. The certification management server 100 measures physical arrangement relationship between the certification points, generates the digitized surface fingerprint information of the certification region based on such a measured relationship, and generates the certification information by combining the extracted image information and the digitized surface fingerprint information generated with the product identification information as a package. The digitized surface fingerprint is at least one piece of information selected from the group consisting of a measured distance between the certification points, a measured distance ratio between the certification points, and a measured angle between the certification points, which are obtained using the certification region and the certification points which are identified in the image where the surface of the all or part of the product is enlarged by 1 time or more.

The physical feature information basically includes the digitized surface fingerprint information that includes position information for the certification points existing on the product surface and arrangement information such as distance or angle between those certification points. Additionally, it may include information on product material and appearance (color, size or shape). Such additional information may be information provided by the manufacturer or the seller.

Meanwhile, the physical feature information may include images of cracks, marks, patterns, defects, accessories, stitches, and shapes of materials, which are naturally occurred due to the production process or unique surface features of the materials.

The certification information may be packaged to include at least one piece of image information selected from the group consisting of the actual image of the entire product, the physical feature information of the product material, the actual image of a specific point on the product surface, or the entire real image which is enlarged by 1 time or more. The image information may be at least one image selected from group consisting of plane images, 2D images, 3D images, holograms and see-through (X-ray) images.

In the embodiment of the present invention, it is described that the serial number/identification number identified from the image of one side of the product and the physical feature information of the product are packaged to generate the certification information, but is not limited thereto; when a fingerprint tag (label) is previously made and configured on (or attached to) the inside of the product, the certification management server 100 may be configured to generate the certification information including the information (or the fingerprint tag information) associated with the fingerprint tag configured on (or attached to) the inside of the product, the digitized surface fingerprint information for a certification region set within the fingerprint tag, the product information, the image information of at least a part of the certification region and the segments corresponding to the certification points.

That is, as shown in FIG. 17, when the fingerprint tag is configured separately, the certification management server 100 confirms the digitized surface fingerprint information for the predetermined certification region of the corresponding fingerprint tag, and generates the certification information packaged including the digitized surface fingerprint information for the confirmed fingerprint tag, the information on the fingerprint tag (or the fingerprint tag information), the product information, and the image information of at least a part of the certification region and the segments corresponding to the certification points. In this case, the fingerprint tag may be applied differently for each product depending on the material or appearance feature information of the fingerprint tag. As the fingerprint tag information has different features, the digitized surface fingerprint information for each fingerprint tag also has different features.

In addition, the certification management server 100 retrieves the product information corresponding to the identification information (e.g. serial number) included in the certification request information received from the store server 200 or the communication terminal 300 via the blockchain network 400 (for example, retrieves from the shared ledgers owned by itself or by other nodes). When there is the previously stored certification information corresponding to the identification information, the retrieved certification information is obtained.

The certification management server 100 selects the certification region and the certification points from the image information of the product to be certified by comparing the image information included in the certification information of the product retrieved with the image information of the product to be certified, included in the received certification request information. The certification management server 100 calculates the digitized surface fingerprint information for the selected certification points, which is compared with the digitized surface fingerprint information included in the product certification information retrieved to determine whether the product is authentic or not. The certification result is provided to the store server 200 or the communication terminal 300.

Meanwhile, the certification management server 100 may execute the authenticity certification process stated above, by receiving the identification information of the product to be certified, input via a user interface provided therein, to retrieve such information from the blockchain network 400, and by directly capturing the image of the product to be certified via a camera module provided in or at least interlocked with the certification management server 100.

The certification information for the authenticity certification may include, at least, the product identification information, the segment images of two or more certification points, and the physical arrangement relationship (distance, angle and ratio) between the certification points, as well as basic information of the product, such as product name, manufacturing date, manufacturer, country of origin, warranty period, product size, product material, and product appearance information (color, size or shape). The certification information may also include entity who has generated the certification information for the product (operator of the certification management server 100), a QR code including a uniform resource identifier (URI) by which the user can find the product information, a service access address for authenticity certification or physical feature information, all or at least part of the image of the certification region, the digitized surface fingerprint image representing the certification region, the certification point and the physical arrangement relationship as a single figure, or a part of the certificate or guarantee including the information useful for certification.

Furthermore, the physical feature information include the surface fingerprint of the product. The surface fingerprint is an irregular pattern naturally occurring during a product production process or naturally formed on a surface of components or materials constituting the product, and at least one piece of information selected from the group consisting of comb pattern, polka dot pattern, crater pattern, mesh pattern, wave pattern, non-woven pattern, sandpaper pattern, stripes, cloud pattern, wave pattern, sand pattern, swirl pattern, bead pattern and block pattern in an image with the surface enlarged by 1 time or more using an image implementation method such as plane, 3D, hologram, or X-ray, which is an image for the certification region or the segments corresponding to the certification points and can be included in the authenticity certification information.

Moreover, when the fingerprint tag is configured on (or attached to) the inside of the product, the certification management server 100 retrieves the product information corresponding to the identification information (e.g. serial number) included in the certification request information received from the store server 200 or the communication terminal 300 via the blockchain network 400. When there is the previously stored certification information corresponding to the identification information, the retrieved certification information is obtained. The certification management server 100 compares the fingerprint tag information included in the certification information retrieved and the digitized surface fingerprint information with the digitized surface fingerprint information calculated from the image information of the product to be certified (or the fingerprint tag/label to be certified) to determine whether the product is authentic. The certification management server 100 provides the authenticity certification result determined to the store server 200 or the communication terminal 300.

For implementing such functions, the certification management server 100 according to the present invention may be configured to include a camera module 110, an input module 120, a position information extraction module 130, a certification target selection module 135, a registration/retrieve module 140, a certification information verification module 145, a certification information generation module 150, a transceiver module 160, and a blockchain interlock module 170 as shown in FIG. 5, and may further configured to additionally include a catalog provision unit 180 or a history addition module 190.

The camera module 110 is preferably configured by a digital microscope camera or equivalent module, which is capable of capturing and displaying image information, exposing an outline reference frame (111, see FIG. 8) which can be adjusted to move on a display screen while capturing the images and has a center point (111a, e.g. cross mark; see FIG. 8) showing a center position of the screen, and displaying coordinates on the basis of a zero-coordinate reference point (0.0) in the lower left corner (other reference point can be defined) for all areas inside the outline reference frame 111. It is further preferred to have a function of accurately measure the actual distance to the object in such an image or optical magnification, but those functions are not essentially required.

The input module 120 provides the user interface for accepting the product information via the position information extraction module 130 and the certification target selection module 135, adjusting distance, angle and focal point between the camera module 110 and the subject, or designating numbers or positions of the one or more certification points existing on the subject surface, which is configured by a keyboard, a keypad or a mouse.

The certification target selection module 135 operates the camera module 110 via the input module 120, set a position, a size or a shape of the outline reference frame 111 corresponding to the certification region on the image screen captured by the camera module 110, and randomly selects the certification points from the subject surface within the certification region. The number of certification points can be designated via the input module 120, and if required, select the certification points manually. When the certification region and the certification points are selected, the image information of at least a part of the certification region and the segment corresponding to the certification points is extracted (see segments P1 to P3 [135*a*] of FIG. 9). The segment image is a small-sized image centered on the certification point or having the certification point as one of the vertices, which can be polygonal or circular. Meanwhile, if necessary, a plurality of (two or three) the reference distance points for displaying a reference distance of, for example, 1 cm or 1 inch, may be further designated to extract the segment images for the reference distance points (see the segments S1 to S3 [135*b*] for the reference distance points of FIG. 12).

The position information extraction module 130 measures distance information and angle information based on the position information of the certification points with the coordinate information of the certification region selected by the certification target selection module 135 as a reference, and generates the digitized surface fingerprint information for the certification region using the measured information. For example, when three or more certification points are selected, the distance between the points (distance between coordinates or actual measured distance) and the angle between line segments connecting a pair of points can be calculated. Meanwhile, information on the actual measured distance (meter or inch) between the points may be calculated, or alternatively, information on the ratio between the line segments connecting the points may be obtained as the distance information.

The registration/retrieve module 140 controls so that the packaged certification information is generated by the certification information generation module 150, accepts the packaged certification information from the certification information generation module 150, transmits such information to the blockchain interlock module 170 as a transaction to be registered in the shared ledgers of all nodes constituting the blockchain, receives the certification request information via the transceiver module 160 including the identification information and image information of the product to be certified from to the store server 200 or the communication terminal 300, and retrieves the product information corresponding to the identification information included in the certification request information from the blockchain shared ledger interlocked via the blockchain interlock module 170. The registration/retrieve module 140 provides to the certification information verification module 145 information retrieved from the blockchain interlock module 170, i.e. the digitized surface fingerprint of the product, the physical feature information (product material) including the certification region image and the image information of the segments corresponding to the certification points, and the image information of the product to be certified included in the certification request information, which are packaged with the identification information. The certification information verification module 145 retrieves a region, matching the certification region image within the certification information retrieved, from the image information of the product to be certified to select the certification region from the image information of the product to be certified, and retrieves regions respectively matching the segment images within the certification information, which are retrieved based on the image of the selected region, to select the certification points, and then calculates the digitized surface fingerprint information (information on the distance and the angle between the certification points within the selected image of the product to be certified). The calculated digitized surface fingerprint information is compared with the digitized surface fingerprint information included in the certification information retrieved to determine whether the product is authentic or not. The certification result is provided to the registration/retrieve module 140, which transmits such a result to the store server 200 or the communication terminal 300 via the transceiver module 160.

The certification information generation module 150 is controlled by the registration/retrieve module 140, which generates the packaged certification information as a unique product feature by binding the product identification information, received from the manufacturer or the seller via the transceiver module 160, or alternatively, captured and extracted by the camera module 110 and the position information extraction module 130, together with product physical feature information.

The transceiver module 160 transmits or receives the product physical feature information based on the product identification information provided by the manufacturer of the seller, or alternatively, the certification request information transmitted by the store server 200 or the communication terminal 300, or the certification result information corresponding to the request.

The blockchain interlock module 170 is configured to operate as a node constituting the blockchain network 400 to interlock with the whole blockchain network 400, which serves as the node of the blockchain network 400 to transmit the product certification information as a transaction to the other nodes, verify the transactions of the other nodes, and include a node for receiving and storing in a shared ledger the transaction information stored in the periodically generated block, as well as the shared ledger. If the blockchain interlock module 170 remains connecting to the blockchain network 400, the shared ledger owned by the blockchain interlock module 170 is always up to date; thus the registration/retrieve module 140 retrieves the product identification information from the shared ledger owned. The access to the shared ledger is also a transaction to the blockchain network 400, thus access history, such as a retrieve request and a response, may be recorded in each shared ledger of the blockchain network 400.

Additionally, the catalog provision unit 180 can generate certificates or guarantees for one or more products using the certification information stored in the blockchain shared ledger via the blockchain interlock module 170, or alternatively, generate a catalog containing such certificates or guarantees, thereby providing to the store server 200 or the communication terminal 300. The catalog generation information may be also recorded in the blockchain shared ledger, and such a catalog may be made by adding the respective information included in the certification information retrieved from the shared ledger to a predetermined template.

When a part of the certification region or the certification points is altered and the certification is failed upon determining whether the product to be certified is authentic or not in the certification information verification module 145, the history addition module 190 extracts the altered information in accordance with a request from the store server 200 or the communication terminal 300, or conditions predetermined for the product (enabling or prohibiting to add new history; it changes less than 10% when new history is allowed to be added), and transmits the a transaction to the blockchain network via the blockchain interlock module 170 as the altered information for the product to be certified, which is added to the certification information of the product and stored in the shared ledger.

For example, the products can be naturally changed, e.g. deformed, worn out or damaged while using such a product. When the retrieve is failed due to some differences in the region upon retrieving the matching regions of the certification region, or when the segments are only partially matched, e.g. four of five are matched but one is filed, upon matching the segment images corresponding to the certification points, it is possible to confirm a case where the authenticity certification is filed due to the partially altered region although the product is authentic, by carrying out the digitized surface fingerprint certification for the matched region only. In such a case, the image corresponding to the certification region or the segment image for the certification point is extracted based on the image of the altered region to generate the altered image information, and transmits such information to the blockchain as a transaction via the blockchain interlock module 170 as additional information associated with the authenticity certification information of the product to be stored in the shared ledger.

Meanwhile, it may be maliciously or transient alteration, thus it is preferred to put the higher priority on information stored earlier so that, upon the certification, the authenticity certification is carried out first for the certification information stored in the shared ledger, and then, when the authenticity certification is failed, the authenticity certification is carried out for from the information stored earlier among the altered information additionally stored.

In the system of the present invention stated above, in a case where the certification management server 100 receives the information to be packaged from the manufacturer or the seller, the certification management server 100 may be configured to include the registration/retrieve module 140, the certification information verification module 145, the certification information generation module 150, the transceiver module 160, and the blockchain interlock module 170 only; on the contrary, in a case where the certification management server 100 obtains the information to be packaged by directly capturing or extracting the identification information and the physical feature information of the product via the camera, instead of receiving from the manufacturer or the seller, the certification management server 100 may be configured to include, at least, the camera module 110, the input module 120, the position information extraction module 130, the certification target selection module 135, registration/retrieve module 140, the certification information verification module 145, the certification information generation module 150, the transceiver module 160, and the blockchain interlock module 170.

The store server 200 is connected with the certification management server 100 via the information communication network, which transmits to the certification management server 100 the certification request information including the identification information and the image of the product to be certified, and receives the corresponding authenticity certification result from the certification management server 100 to output the result by a display or a printer provided therein.

Meanwhile, the store sever 200 includes a node configuration of the blockchain network 400 and holds all certification information by the shared ledgers of the nodes, receives or accepts the identification information of the product to be certified to retrieve the certification information of the product corresponding to the product identification information from the shared ledger held, captures the image of the product to be certified by the camera provided therein, selects the certification region and the certification points from the image information of the product to be certified based on the image information included in the product certification information retrieved, and calculates the digitized surface fingerprint information for the selected certification points, which is compared with the digitized surface fingerprint information included in the product certification information retrieved to determine whether the product is authentic or not. The store server 200 can output the authenticity certification result in various ways, for example, outputting on the display or printing by the printer. That is, the store sever 200 can directly carry out the authenticity certification process by participating as the node of the blockchain network 400, and the access history of the store server 200 can be stored in the blockchain network 400.

The communication terminal 300 is connected with the certification management server 100 via the information communication network, which transmits to the certification management server 100 the certification request information including the identification information and the image of the product to be certified, and receives the corresponding authenticity certification result from the certification management server 100 to represent the result on a display provided therein.

Meanwhile, the communication terminal 300 includes a node configuration of the blockchain network and holds all certification information by the shared ledgers of the nodes, or alternatively, at least retrieves the certification information from the blockchain network 400 by sending a request to the store server 200 or the certification management server 100. The communication terminal 300 receives or accepts the identification information of the product to be certified to retrieve the certification information of the product corresponding to the product identification information via the blockchain network 400, captures the image of the product to be certified by the camera provided therein; selects the certification region and the certification points from the image information of the product to be certified based on the image information included in the product certification information retrieved from the blockchain shared ledger, calculates the digitized surface fingerprint information for the selected certification points, which is compared with the digitized surface fingerprint information included in the product certification information retrieved to determine whether the product is certified as original or not.

The authenticity certification result can be represented on the display. That is, the communication terminal 300 can participate as the node of the blockchain network 400 to retrieve the certification information corresponding to the identification information of the product to be certified, or alternatively, transmits the product identification information to the certification management server 100 or the store sever 200, respectively participating as the node of the blockchain network 400 and receives the corresponding certification information, thereby directly carrying out the authenticity certification process.

For implementing those configurations, the store server 200 or the communication terminal 300 may be respectively configured to include a terminal camera module, a terminal input module, a terminal certification target selection module, a terminal positional information extraction module, a terminal retrieve module, a terminal certification information verification module, and a terminal transceiver module, of which configurations and operation mechanisms are the same as those corresponding modules of the certification management server 100.

FIG. 6 is a flowchart illustrating a process of generating and storing the certification information of the certification management server 100 according to the embodiment of the present invention.

As shown in FIG. 6, the certification management server 100 collects the production information, such as the production identification information (serial number or equivalent) and the images.

In this step, the certification management server 100 accepts the identification information of the product for which the authenticity certification information is generated via the input module 120, or identify and extract a code (bar code or QR code) corresponding to the identification information via the camera module 110, or alternatively, receives from the certification target selection module 135, while collecting the product image received from the certification target selection module 135 or captured by the camera module 110 as the physical feature information of the product corresponding to the product identification information received. In addition to the product image information, product name, manufacturing date, manufacturer, country of origin, warranty period, product size, product material, product appearance information (color, size or shape), entire image of the product may be further collected as the basic information of the product (those pieces of information can collected from the manufacturer or the seller as the information corresponding to the product identification information.

Next, the certification management server 100 sets the reference region from the image of the product to be certified, selects the certification points, and extracts the segments images for the certification points.

In this step, the certification target selection module 135 provides the collected product images via the display. The certification region is set via the input module 120. A plurality of the certification points are selected from the certification region to extract the image information of at least a part of the certification region and the segments corresponding to the certification points.

The certification target selection module 135 of the certification management server 100 shows a boundary for setting the certification region within the product image on the display, provides the interface for setting the boundary, varies at least one of a size and a shape of the boundary by inputting to the interface via the input module 120, and determines the plurality of the certification points randomly up to a preset number of points, or alternatively, determines based on information on numbers or positions designated via the interface accepting the user's input made via the input module 120.

Next, the certification management server 100 measures the position information and the relationship information based on the certification points.

In this step, the positional information extraction module 130 of the certification management server 100 measures the relationship information such as the distance information and the angle information, based on the position information of the certification points, and generates the digitized surface fingerprint information for the certification region using the measured information. The information on the distance between the certification points, encompassed in the digitized surface fingerprint information, may be calculated as the ratio information of the distance between the certification points, not the numerical information.

Next, the certification management server 100 generates the certification information in which the identification information (serial number, etc.) and the physical feature information of the product are packaged.

In this step, the certification information generation module 150, as controlled by the registration/retrieve module 140, generates the packaged certification information as a unique product feature by combining the digitized surface fingerprint information and image information of at least a part of the certification region and the segments corresponding to the certification points, with the product identification information, so that the certification information is retrieved by the product identification information. The packaged certification information may include entity who has generated the certification information for the product (operator of the certification management server 100), a QR code including a uniform resource identifier (URI) by which the user can find the product information, a service access address for authenticity certification or physical feature information, all or at least part of the image of the certification region, the digitized surface fingerprint image representing the certification region, the certification point and the physical arrangement relationship as a single figure (see example of FIG. 15), and a part of the certificate or guarantee (see example of FIG. 16) including the information useful for certification, which may be collected from the manufacturer or the seller via the transceiver module 160, generated from the digitized surface fingerprint information created by the position information extraction module 130, or generated by the certification information generation module 150 by combining such information.

When the fingerprint tag (label) is previously made and configured on (or attached to) the inside of the product, the certification management server 100 may generate the certification information including the information (or the fingerprint tag information) associated with the fingerprint tag configured on (or attached to) the inside of the product, the digitized surface fingerprint information for the certification region set within the fingerprint tag, the product information, the image information of at least a part of the certification region and the segments corresponding to the certification points.

Next, the certification management server 100 registers the generated certification information in the blockchain network 400.

In this step, the registration/retrieve module 140 of the certification management server 100 transmits the generated certification information by the blockchain interlock module 170 to the interlocked blockchain network (400) as a transaction to be added to the periodically generated block, thereby sharing the certification information by the shared ledger provided in each node of the blockchain network 400.

FIG. 7 is a flowchart illustrating an authenticity certification process of the product to be certified of the certification management server 100 according to the embodiment of the present invention.

As shown in FIG. 7, the certification management server 100 receives the certification request information for the product to be certified for which the certification is required.

In this step, when the store server or the communication terminal transmits a request for certifying product authenticity via the transceiver module 160, the certification management server 100 receives the certification request information including the identification information and the image information of the product to be certified. The user may give a direct request for authenticity certification by bringing the product to be certified to a location at which the certification management server 100 is installed; in such a case, the identification of the product to be certified can be input by the user via the input module 120, and the image information of the product to be certified can be received via the certification target selection module 135 or directly captured by the camera module 110.

Next, the certification management server 100 retrieves, based on the identification information included in the certification request information, to find whether there is the certification information that corresponds to the identification information and has been already stored in the blockchain network 400.

In this step, the registration/retrieve module 140 retrieves the certification information of the product from the blockchain shared ledger, based on the product identification information included in the certification request information, via the blockchain interlock module 170, to confirm whether the corresponding certification information is present or not. When the corresponding certification information is not present, it is determined as the certification error; when the corresponding certification information is present, the certification information is obtained from the blockchain network 400 (i.e. from the shared ledger).

Next, the certification management server 100 receives the image of the product to be certified, extract the images of the certification region and the segments for the certification points from the packaged certification information retrieved, and compares the extracted images with the received image of the product to be certified to match each other. If the matching is failed, it is determined as the certification error; if the matching is succeeded, the following certification process will be proceeded.

In this case, the certification information verification module 145 obtains the image information of at least a part of the certification region and the segments corresponding to the certification points, from the product certification information retrieved from the blockchain shared ledger, retrieves the image of at least a part of the certification region from the image information of the product to be certified to select the matched certification region from the image information of the product to be certified, and retrieves, when the certification region is selected from the image information of the product to be certified, the images of the segments corresponding to the certification points from such a certification region to select the matched certification points.

In such a case, it is preferable that the region matching the image of at least a part of the certification be retrieved from the image information of the product to be certified to confirm whether the certification region is present or not and to select the target region, but this step can be omitted; the certification region and the certification points may be confirmed as being present at once, by retrieving the regions matching the images of the segments corresponding to the certification points from the image information of the product to be certified.

For example, as shown in FIG. 11, the corresponding certification points may be determined by selecting points matching the images of the segments corresponding to the certification points from the image information of the product to be certified.

The image of product to be certified may be taken by a low-quality camera built into the communication terminal 300 owned by the customer, such as a smartphone, a feature phone, a tablet or a notebook under the general environment, instead of a studio, which may be suffered by wrong color representation or shooting plane distortion.

There are lots of up-to-date image matching algorithms, such as matching algorithm using neural network or deep learning (SIFT (Scale Invariant Feature Transformation) algorithm, HOG (Histogram of Oriented Gradient) algorithm, Harris Corner algorithm, FAST (Features from Accelerated Segment Test) algorithm, SURF algorithm, histogram smoothing algorithm, etc.), which extract and match feature points so as to robust to rotation, enlargement, reduction or distortion. Thus it is possible to efficiently match images even with the distorted images and to restore the distorted image to the original one.

For example, as shown in FIG. 14, when the image of the product to be certified ((a) of FIG. 14) is distorted, the image distortion of the product to be certified can be compensated as in (b) of FIG. 14 as the images of the segments corresponding to the certification points successfully match.

Next, the certification management server 100 measures the position information and the relationship information of the certification points selected from the product to be certified, and compare with the position information and the relationship information, included in the authenticity certification information stored, to confirm whether they match or not. When they do not match, it is determined as the certification error; when they match, the process will proceed to next step of determining whether the product is authentic or not.

In this step, the certification information verification module 145 calculates, when the certification points are selected from the image information of the product to be certified, the digitized surface fingerprint information for each certification point. The digitized surface fingerprint information is calculated based on the measured information, which obtained by measuring the coordinates of the selected certification points, the distance information between the certification points, and the angle information between the line segments connecting the certification points. When comparing the digitized surface fingerprint information calculated with the digitized surface fingerprint information of the authenticity certification information retrieved from the blockchain network 400, if they match, it is determined that the product is authentic; if they do not match, it is determined as the certification error.

With such a configuration, the authenticity certification can be carried out based on the authenticity certification information stored in the blockchain network, the certification request information can be generated based on the image of the product to be certified, taken by any communication terminal 300 owned by the customer or the seller, as the quality requirement is significantly reduced for the image of the product to be certified to give a request for authenticity certification, and the store server 200 can also generate the certification request information even without a high-quality camera module.

Meanwhile, the operation mechanism illustrated by FIG. 7 may be directly conducted in the same manner in the store sever 200 or the communication terminal 300, each of which interlocks with the blockchain network 400 as a node; it does not have to be carried out in the certification management server 100.

Although not specifically shown, when the distance information between the certification points is calculated as accurate numerical information in meters or inches, the authenticity certification is not available without the accurate calculation of the distance information. Therefore, in a case where the certification management server 100 generates the authenticity certification information, by adding the reference distance points representing a correct reference distance to the certification region in addition to the certification points, and by the selecting such reference distance points from the image of the product to be certified upon the certification of the product to be certified, the distances between the reference points can be relatively calculated based on the reference distance.

When selecting the certification points and extracting the segment images corresponding to the certification points, as shown in FIG. 6, a step may be further included that at least two reference distance points are automatically determined and the image information of the segments corresponding to the reference distance points. For example, as shown in FIG. 12, the certification target selection module 135 may select the certification points (P1 and P3), select three reference distance points (S1 to S3) with 1-cm distance in order to check the distance information on the plane, and then extract the image information (135b) of the corresponding segments.

The certification information generation module 150 may further embed the image information of the segments corresponding to the reference distance points into the certification information, and then, the certification information verification module 145 may further retrieve the segments corresponding to the reference distance points from the image information of the product to be certified and select the matched reference distance point, obtain the reference distance information, and then calculate the distance information for each certification point based on the reference distance information. Even when it is difficult to accurately measure the distance in the image, the distance between certification points can be accurately calculated based on the pixel ratio.

Figure 13:
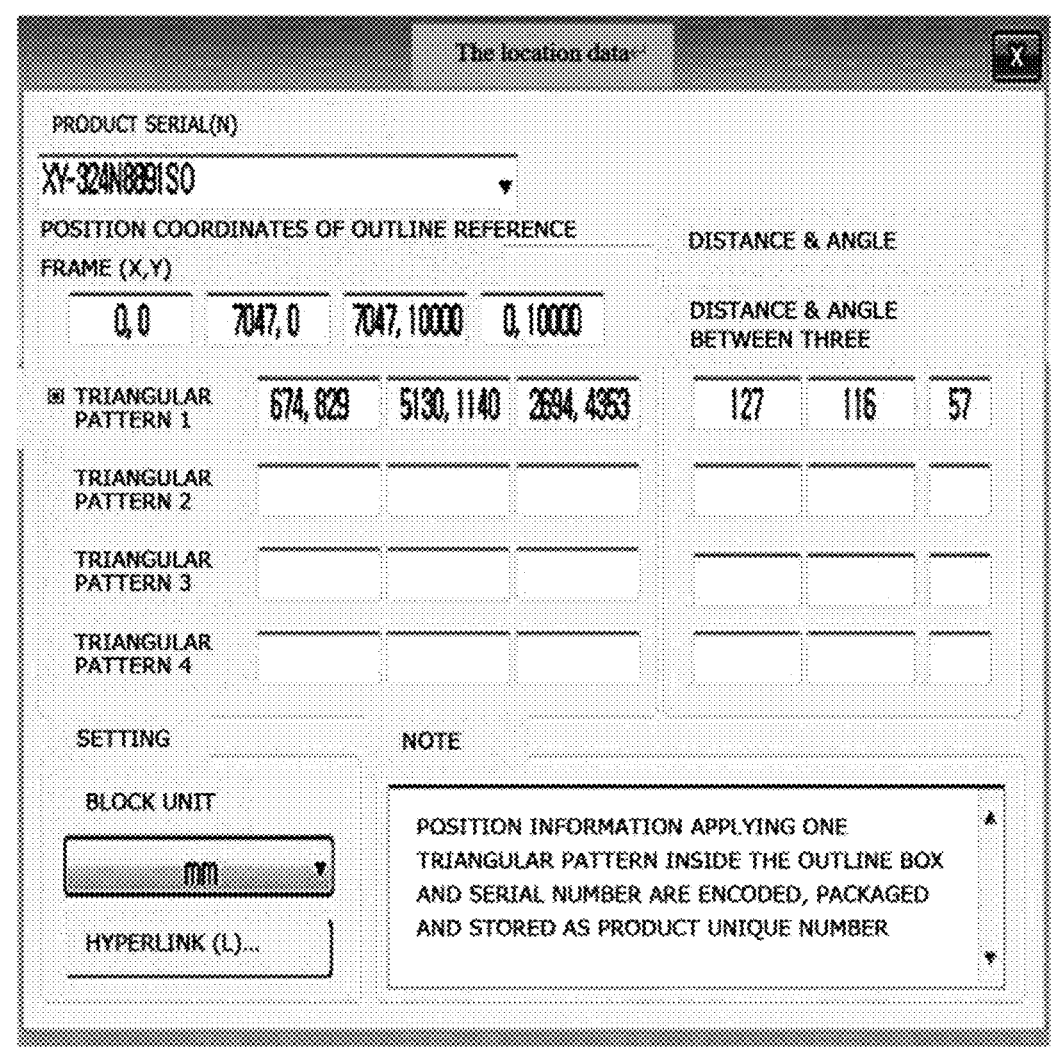

Specific embodiments of a process of generating and storing the certification information of the certification management server 100 and the authenticity certification of the product to be certified will be described with reference to FIGS. 8 to 16.

At first, when the product identification information (serial number or equivalent display information) and the physical feature information of the product material are captured or extracted via the camera module 110, instead of receiving from the manufacturer or the seller, the user activates the camera module 110 and manipulates the input module 120 to focus the camera module 110 on the product (object) for which the authenticity (genuine) information is required, and then the outline reference frame 111 having the cross mark (111a) at a center of the display is exposed on a screen displayed by the camera modules 110 while capturing the image, as shown in FIG. 8. Therefore the user can adjust the outline reference frame 111 to move the camera to the desired position. A region selected by the outline reference frame 111 corresponds to the certification region.

The certification target selection module 135 can represent any surface point as the coordinate information on the display with the zero-coordinate point (0.0) inside the outline reference frame as a reference point. The zero-coordinate (0,0) reference point is fixed at the lower left of the outline reference frame. When the outline reference frame is moved up, down, left, and right around a specific point, the position of the zero-coordinate reference point changes and the corresponding position information (coordinates, angle, interval, and distance) is measured and displayed (the zero-coordinate reference point can be defined at the other position if needed). Therefore, when one or more triangular patterns are set in the outline reference frame to measure the position information of several points, it is possible to efficiently determine whether the product is authentic or not, by tracking the position of the specific point more precisely.

For example, the certification target selection module 135 extracts the entire image or the image of a certain size based on the cross mark 111a (can be omitted), for the certification region set as illustrated in FIG. 9, and selects a plurality of certification points at random from the corresponding certification region. The user can set the number of the certification points via the input module 120 and, if necessary, can designate the certification points by operating a mouse. As shown in the example, when three certification points (P1 to P3) are selected, the images (135a) of the segments having a certain size are extracted around the corresponding certification point.

The position information extraction module (130) checks the position coordinates between the certification points selected, calculates the position information such as the information on the distance or the angle between the certification points, thereby calculating the distance between the certification points and the angle information based on the line segments connecting the certification points.

If necessary, the coordinate, the distance, and the angle of each certification point may be displayed on the screen with a position information display tool window as shown in FIG. 13 so that the user can check them. The measured distance can be represented by a numerical value (mm). Taking account of a case where it is difficult to accurately measure the distance, the ratio of the line segments connecting the certifications point may be employed as the distance information.

Therefore, the registration/retrieve module 140 receives the position information for the three certification points selected in a triangular pattern from the position information extraction module 130, and transmits such information to the certification information generation module 150. The certification information generation module 150 generates the packaged certification information including the unique product feature information by binding such information together with the product identification information captured and extracted by the camera module. The registration/retrieve module 140 receives the packaged certification information from the certification information generation module 150 and transmits such information as a transaction to the blockchain interlock module 170 to be stored in the shared ledgers of all the nodes constituting the blockchain.

Next, the certification management server 100 determines whether or not the request information for product authenticity certification is received from the store sever 200 or the communication terminal 300; if there is the certification request, the product information corresponding to the identification information of the product to be certified, included in the certification request information, is retrieved from the blockchain network 400.

Upon retrieving, the certification management server 100 determines whether or not the identification information of the product to be certified included in the certification request information is registered in the shared ledger of the blockchain network 400. When the identification information of the product to be certified is registered in the shared ledger, the certification management server 100 extracts the digitized surface fingerprint information and the image information (of the certification region and the segments corresponding to the certification points), which are packaged with the identification information retrieved from the shared ledger.

The certification management server 100 selects the region matching the certification region image included in the authenticity certification information, from the image information of the product to be certified included in the certification request information; if there is a matched region, the region is considered as the certification region, and then the regions matching the segment images for the segment image included in the authenticity certification information within such a region. For example, the certification points can be selected if there are segment images for the certification points, matched as shown in FIG. 11.

As shown in FIG. 14, when the image of the product to be certified is distorted in a case of selecting the segment images corresponding to the certification points or the region corresponding to the certification region image, the distorted image can be restored based on the image of the authenticity certification information.

The digitized surface fingerprint information is calculated for each certification points selected from the image information of the product to be certified, which is compared with the digitized surface fingerprint information of the authenticity certification information; if they match, it is determined that the product is authentic, and if they do not match, it is determined as the certification error.

Furthermore, the certification management server 100 may generate certificates or guarantees for one or more products using the certification information stored in the blockchain shared ledger via the catalog provision unit 180. The authenticity certification information can be stored as a package by generating the digitized surface fingerprint information as an image, in which the positions of the certification points are marked on the image of the certification region, with the distance information and the angle information between the certification points, as shown in FIG. 15. Meanwhile, the catalog provision unit 180 may generate a catalog including one or more certificates in a format shown in FIG. 16 by the authenticity certification information.

The method according to the embodiments may be implemented in a form of program instructions that can be executed by various computers and recorded in a computer-readable medium. The computer-readable medium may include program instructions, data files and data structures alone or in combination. The program instructions recorded on the medium may be specially designed and configured for the embodiment, or may be known to the those having ordinary skills in the art of computer software. Examples of computer-readable recording media include large data storage medium such as physical hard disks, solid state drives (SSDs), web hard and cloud storage; magnetic media such as floppy disks and magnetic tapes; optical media such as CD-ROM and DVD; magneto-optical media such as floptical disks; and hardware devices specially configured to store and execute program instructions such as ROM, RAM and flash memory. Examples of the program instructions include not only machine language codes such as those produced by the compiler, but also high-level language codes that can be executed by the computer using, for example, the interpreter. The hardware device described above may be configured by one or more software modules to execute the operations of the embodiment, and vice versa.

Preferred embodiments according to the present invention have been illustrated and described. However, the present invention is not limited to the embodiments stated above, and may be modified, altered or improved by those having ordinary skill in the art without departing from the gist of the present invention.

BRIEF DESCRIPTION OF THE REFERENCE SYMBOLS

100: certification management server
110: camera module
111: outline reference frame
111a: center point
120: input module
130: position information extraction module
135: certification target selection module
140: registration/retrieve module
145: certification information verification module
150: certification information generation module
160: transceiver module
170: blockchain interlock module
200: store server
300: communication terminal
400: blockchain network

The invention claimed is:

1. A method for certifying product authenticity using physical feature information of a product, including digitized surface fingerprint, and a blockchain, the method being implemented by a certification management server, in a system including the certification management server that is communicably connected with a store server operated by a manufacturer or a seller via an information communication network, wherein the certification management server receives certification request information required for product certification from the store server or a communication terminal, each of which is capable of scanning and decoding product identification information and capturing a product image, and transmits certification result information, and wherein at least one of the store server and the certification management server is interlocked with a blockchain network as a node, the method comprising steps of:

(a) extracting image information of at least a part of a certification region and segments corresponding to a plurality of certification points, by setting the certification region from a product image captured or received and by determining the plurality of the certification points within the certification region, as physical feature information of a product corresponding to the product identification information received;

(b) measuring physical arrangement relationship between the certification points, generating digitized surface fingerprint information of the certification region based on such a measured relationship, and generating certification information by combining the extracted image information and the digitized surface fingerprint information generated with the product identification information as a package, followed by transmitting the generated certification information to the interlocked blockchain network to be registered in a shared ledger of each node;

(c) receiving, when the store server or the communication terminal transmits a request for certifying product authenticity, certification request information including identification information and image information of a product to be certified, and retrieving certification information of the product corresponding to the product identification information included in the certification request information from the blockchain shared ledger; and (d) comparing the image information of the product to be certified, included in the certification request information received, with the image information included in the product certification information retrieved from the blockchain shared ledger, to select a certification region and certification points from the image information of the product to be certified, calculating digitized surface fingerprint information for the selected certification points, which is compared with the digitized surface fingerprint information included in the product certification information retrieved to determine whether the product is authentic or not, and providing the certification result to the store server or the communication terminal, wherein the step (a) further comprises automatically determining at least two reference distance points such as 1 cm or 1 inch representing a correct reference distance, and extracting image information of segments corresponding to the reference distance points;

the step (b) further comprises embedding the image information of the segments corresponding to the reference distance points into the certification information; and the step (d) further comprises obtaining reference distance information by retrieving the segments corresponding to the reference distance points from the image information of the product to be certified and selecting the matched reference distance points, and then calculating distance information for each certification point based on the reference distance information, wherein the step (d) further comprises matching the segment images corresponding to the certification points, when a part of the certification region or the certification points is altered and thus the certification is failed upon determining whether the product to be certified is authentic or not, in order to confirm a case where the authenticity certification is filed due to the partially altered region although the product is authentic, extracting the altered information in accordance with a request from the store server or the communication terminal or conditions predetermined for the product; transmitting a transaction to the blockchain network as the altered information for the product to be certified; and storing the altered information by adding the transaction to the certification information of such a product, wherein it is set to put the higher priority on information stored earlier among the certification information stored in the shared ledger and the altered information additionally stored upon the certification.

2. The method according to claim 1, wherein the step (a) further comprises: displaying an outline of the product image for setting the certification region on a display of the certification management server; providing an interface for setting a boundary; and varying at least one of a size and a shape of the boundary by inputting to the interface.

3. The method according to claim 1, wherein the step (a) further comprises: determining the plurality of the certification points within the certification region randomly up to a preset number of points, or alternatively, determining based information on numbers or positions designated by a user, which is received via an interface accepting the user's input.

4. The method according to claim 1, wherein the step (b) further comprises:

(b1) measuring distance information and angle information based on position information of the certification points to generate the digitized surface fingerprint information for the certification region using the measured information;

(b2) generating packaged certification information as a unique product feature by combining the digitized surface fingerprint information and image information of at least a part of the certification region and segments corresponding to the certification points, with the product identification information, so that the certification information is retrieved by the product identification information; and (b3) transmitting the generated certification information to the interlocked blockchain network as a transaction to be added to a periodically generated block, thereby sharing the certification information by a shared ledger provided in each node of the blockchain network.

5. The method according to claim 1, wherein the step (d) further comprises:

(d1) obtaining the image information of at least a part of the certification region and segments corresponding to the certification points, from the product certification information retrieved from the blockchain shared ledger, and then retrieving an image of at least a part of the certification region from the image information of the product to be certified to select the matched certification region from the image information of the product to be certified;

(d2) retrieving, when the certification region is selected from the image information of the product to be certified, images of the segments corresponding to the certification points included in the certification information from such a certification region to select the matched certification points; and (d3) calculating, when the certification points are selected from the image information of the product to be certified, the digitized surface fingerprint information for each certification point.

6. The method according to claim 5, wherein distortion of the image information of the product to be certified is compensated based on the image of the certification region or the segments corresponding to the certification points, matched in the image information of the product to be certified, in at least one of the step (d1) or (d2).

7. The method according to claim 1, further comprising a step of:

(e) generating certificates or guarantees for one or more products using the certification information stored in the blockchain shared ledger, or alternatively, generating a catalog containing such certificates or guarantees, thereby providing to the communication terminal or the store server.

8. The method according to claim 1, wherein the physical feature information include a surface fingerprint of the product, which is an irregular pattern naturally occurring during a production process or naturally formed on a surface of components or materials constituting the product, and at least one piece of information selected from the group consisting of comb pattern, polka dot pattern, crater pattern, mesh pattern, wave pattern, non-woven pattern, sandpaper pattern, stripes, cloud pattern, wave pattern, sand pattern, swirl pattern, bead pattern and block pattern, and is identified in an image with the surface enlarged by 1 time or more using an image implementation method such as plane, 3D, hologram, or X-ray.

9. The method according to claim 1, wherein the physical feature information includes the digitized surface fingerprint, and the digitized surface fingerprint is at least one piece of information selected from the group consisting of a measured distance between the certification points, a measured distance ratio between the certification points, and a measured angle between the certification points, which are obtained using the certification region and the certification points which are identified in an image where a surface of the all or part of the product is enlarged by 1 time or more.

10. The method according to claim 1, wherein the authenticity certification information is packaged as a unique product feature by binding altogether at least one piece of information selected from the group consisting of product identification information, certification region information, information on certification points designated within the certification region, image information of segments corresponding to the certification points, digitized surface fingerprint information, appearance information categorized by color, size or shape, and image information where the entire real image is enlarged by 1 time or more.

11. A system for certifying product authenticity using physical feature information of a product, including digitized surface fingerprint, and a blockchain, the system comprising:
 a certification management server which:
  extracts image information of at least a part of a certification region and segments corresponding to a plurality of certification points, by setting the certification region from a product image captured or received and by determining the plurality of the certification points within the certification region, as physical feature information of a product corresponding to the product identification information received,
  measures physical arrangement relationship between the certification points, generating digitized surface fingerprint information of the certification region based on such a measured relationship, and generates certification information by combining the extracted image information and the digitized surface fingerprint information generated with the product identification information as a package, followed by transmitting the generated certification information to the interlocked blockchain network to be registered in a shared ledger of each node,
  receives certification request information including identification information and image information of a product to be certified, and retrieves certification information of the product corresponding to the product identification information included in the certification request information from the blockchain shared ledger, and
  compares the image information of the product to be certified, included in the certification request information received, with the image information included in the product certification information retrieved from the blockchain shared ledger, to select a certification region and certification points from the image information of the product to be certified, calculates digitized surface fingerprint information for the selected certification points, which is compared with the digitized surface fingerprint information included in the product certification information retrieved to determine whether the product is authentic or not, and provides the certification result;
 a store server which provides to the certification management server the certification request information including the identification information and the image information of the product to be certified, and receives the certification result from the certification management server to output the result via a display or a printer provided therein; and
 a communication terminal which provides to the certification management server the certification request information including the identification information and the image information of the product to be certified, and receives the certification result from the certification management server to output the result via a display provided therein,
 wherein the certification management server automatically determines at least two reference distance points such as 1 cm or 1 inch representing a correct reference distance, extracts image information of segments corresponding to the reference distance points, embeds the image information of the segments corresponding to the reference distance points into the certification information, obtains reference distance information by retrieving the segments corresponding to the reference distance points from the image information of the product to be certified and selecting the matched reference distance points, and then calculates distance information for each certification point based on the reference distance information, matches the segment images corresponding to the certification points, when a part of the certification region or the certification points is altered and thus the certification is failed upon determining whether the product to be certified is authentic or not, in order to confirm a case where the authenticity certification is filed due to the partially altered region although the product is authentic, extracts the altered information in accordance with a request from the store server or the communication terminal or conditions predetermined for the product, transmits a transaction to the blockchain network as the altered information for the product to be certified, and stores the altered information by adding the transaction to the certification information of such a product, wherein it is set to put the higher priority on information stored earlier among the certification information stored in the shared ledger and the altered information additionally stored upon the certification.

12. The system according to the claim 11, wherein the store sever includes a node configuration of the blockchain network and holds all certification information by the shared ledgers of the nodes; receives or accepts the identification information of the product to be certified to retrieve the certification information of the product corresponding to the product identification information from the shared ledger held; captures an image of the product to be certified by a camera provided therein; selects the certification region and the certification points from the image information of the product to be certified based on the image information included in the product certification information retrieved; calculates the digitized surface fingerprint information for the selected certification points, which is compared with the digitized surface fingerprint information included in the product certification information retrieved to determine whether the product is authentic or not; and outputs the certification result.

13. The system according to the claim 11, wherein the communication terminal includes a node configuration of the blockchain network and holds all certification information by the shared ledgers of the nodes, or alternatively, at least retrieves the certification information via the blockchain network; receives or accepts the identification information of the product to be certified to retrieve the certification information of the product corresponding to the product identification information via the blockchain network; captures an image of the product to be certified by a camera provided therein; selects the certification region and the certification points from the image information of the product to be certified based on the image information included in the product certification information retrieved from the blockchain shared ledger; calculates the digitized surface fingerprint information for the selected certification points, which is compared with the digitized surface fingerprint information included in the product certification information retrieved to determine whether the product is authentic or not; and displays the certification result.

* * * * *